United States Patent
Murata

(10) Patent No.: US 11,049,325 B2
(45) Date of Patent: Jun. 29, 2021

(54) INFORMATION PROCESSING APPARATUS, INFORMATION PROCESSING METHOD, AND PROGRAM

(71) Applicant: SONY CORPORATION, Tokyo (JP)

(72) Inventor: Ryosuke Murata, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/759,055

(22) PCT Filed: Sep. 5, 2018

(86) PCT No.: PCT/JP2018/032795
§ 371 (c)(1),
(2) Date: Apr. 24, 2020

(87) PCT Pub. No.: WO2019/087564
PCT Pub. Date: May 9, 2019

(65) Prior Publication Data
US 2020/0372716 A1   Nov. 26, 2020

(30) Foreign Application Priority Data
Nov. 1, 2017   (JP) .............................. JP2017-211645

(51) Int. Cl.
*G06T 19/00* (2011.01)
*G06T 7/70* (2017.01)
(Continued)

(52) U.S. Cl.
CPC ............ *G06T 19/006* (2013.01); *G06F 3/011* (2013.01); *G06K 9/00375* (2013.01); *G06T 7/70* (2017.01);
(Continued)

(58) Field of Classification Search
CPC ....... G06T 19/006; G06T 7/70; G06T 119/20; G06T 2207/30196; G06T 2219/2004; G06T 2219/2016; G06F 3/011; G06K 9/00375
See application file for complete search history.

(56) References Cited

U.S. PATENT DOCUMENTS

| | | | |
|---|---|---|---|
| 2002/0037768 A1* | 3/2002 | Ohshima | G06F 3/017 463/30 |
| 2015/0040040 A1* | 2/2015 | Balan | G06F 3/0482 715/762 |
| 2016/0239080 A1* | 8/2016 | Marcolina | G06T 19/20 |

FOREIGN PATENT DOCUMENTS

JP    2002-112286 A    4/2002

* cited by examiner

*Primary Examiner* — Chong Wu
(74) *Attorney, Agent, or Firm* — Paratus Law Group, PLLC

(57) ABSTRACT

There is provided an information processing apparatus, an information processing method and a program capable of adaptively changing the posture of a virtual object in accordance with a relationship between position information of the virtual object in a real space and position information of a real object. The information processing apparatus includes an information acquisition unit that acquires position information of a virtual object displayed by a display unit in a real space, position information of a first real object associated with a user, and position information of a second real object in the real space; and a display control unit that changes a posture of the virtual object on the basis of a posture change rule corresponding to a relationship between the position information of the virtual object, the position information of the first real object, and the position information of the second real object.

20 Claims, 30 Drawing Sheets

(51) Int. Cl.
 G06F 3/01 (2006.01)
 G06K 9/00 (2006.01)
 G06T 19/20 (2011.01)
(52) U.S. Cl.
 CPC .... *G06T 19/20* (2013.01); *G06T 2207/30196* (2013.01); *G06T 2219/2004* (2013.01); *G06T 2219/2016* (2013.01)

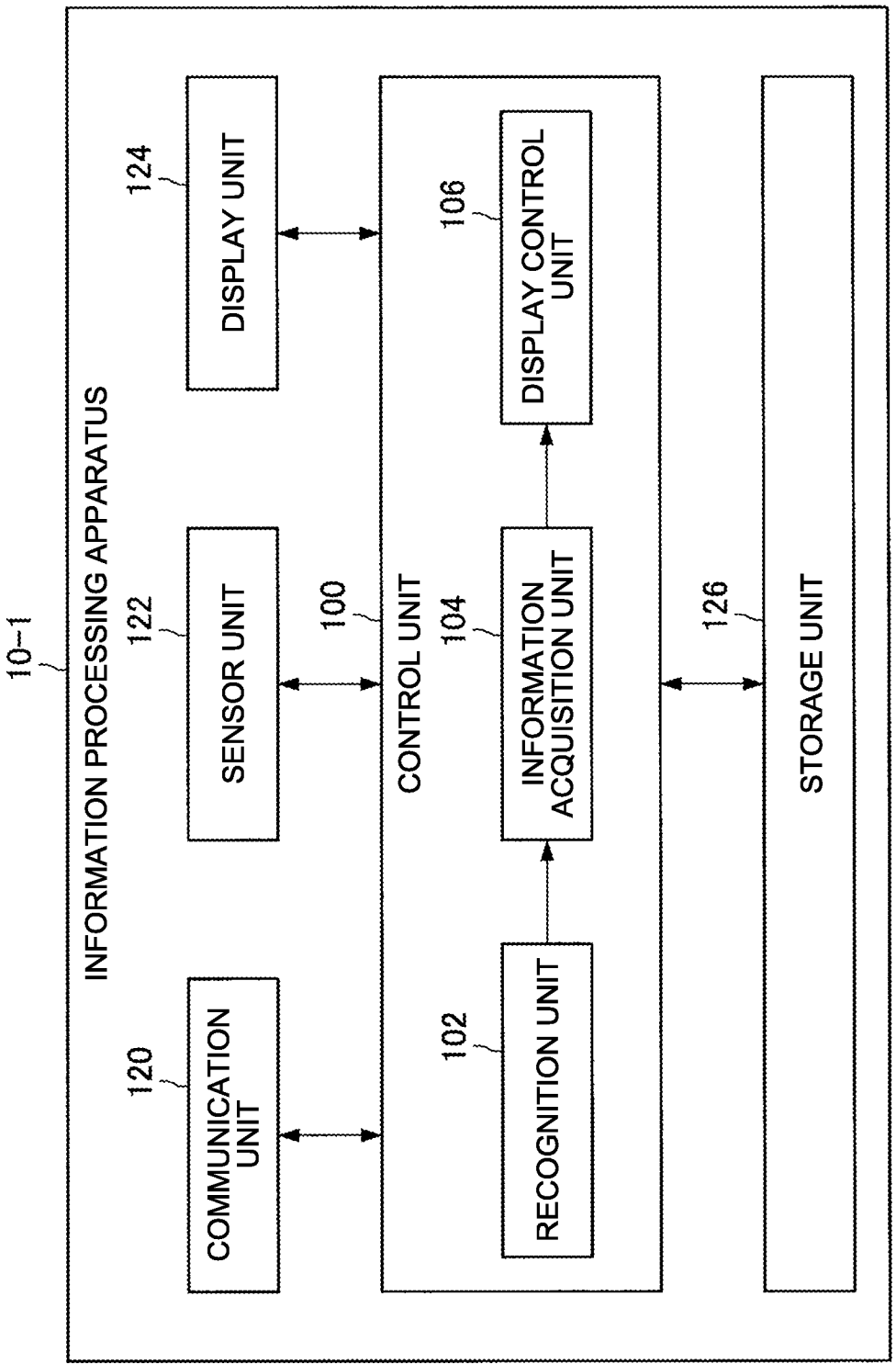

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2018/032795 (filed on Sep. 5, 2018) under 35 U.S.C. § 371, which claims priority to Japanese Patent Application No. 2017-211645 (filed on Nov. 1, 2017), which are all hereby incorporated by reference in their entirety.

FIELD

The present disclosure relates to an information processing apparatus, an information processing method, and a program.

BACKGROUND

Conventionally, various technologies relating to virtual reality (VR) and augmented reality (AR) have been developed. In VR, a user can view, with a high degree of immersion, an image of a three-dimensional virtual space generated by a computer, for example. In addition, the AR can present various information (for example, a virtual object) to the user in association with the user's position in the real space.

For example, Patent Literature 1 below describes a technique for controlling appearance and disappearance of a virtual object on the basis of an action performed by the user in the real space.

CITATION LIST

Patent Literature

Patent Literature 1: International Publication No. 2014/171200

SUMMARY

Technical Problem

However, the technique described in Patent Literature 1 has not considered changing the posture of the virtual object adaptively to the relationship between the position information of a virtual object in the real space and the position information of a specific real object.

Therefore, the present disclosure proposes a novel and improved information processing apparatus, an information processing method and a program capable of adaptively changing the posture of a virtual object in accordance with the relationship between the position information of the virtual object in the real space and the position information of the real object.

Solution to Problem

According to the present disclosure, an information processing apparatus is provided that includes: an information acquisition unit that acquires position information of a virtual object displayed by a display unit in a real space, position information of a first real object associated with a user, and position information of a second real object in the real space; and a display control unit that changes a posture of the virtual object on the basis of a posture change rule corresponding to a relationship between the position information of the virtual object, the position information of the first real object, and the position information of the second real object.

Moreover, according to the present disclosure, an information processing method is provided that includes: acquiring position information of a virtual object displayed by a display unit in a real space, position information of a first real object associated with a user, and position information of a second real object in the real space; and changing, by a processor, a posture of the virtual object on the basis of a posture change rule corresponding to a relationship between the position information of the virtual object, the position information of the first real object, and the position information of the second real object.

Moreover, according to the present disclosure, a program is provided that causes a computer to function as: an information acquisition unit that acquires position information of a virtual object displayed by a display unit in a real space, position information of a first real object associated with a user, and position information of a second real object in the real space; and a display control unit that changes a posture of the virtual object on the basis of a posture change rule corresponding to a relationship between the position information of the virtual object, the position information of the first real object, and the position information of the second real object.

Advantageous Effects of Invention

As described above, according to the present disclosure, it is possible to adaptively change the posture of the virtual object in accordance with the relationship between the position information of the virtual object in the real space and the position information of the real object. Note that the effects described here are not necessarily limited, and may be any of the effects described in the present disclosure.

BRIEF DESCRIPTION OF DRAWINGS

FIG. 4 is a functional block diagram illustrating a configuration example of an information processing apparatus 10-1 according to the first embodiment.

DESCRIPTION OF EMBODIMENTS

Figure 1:
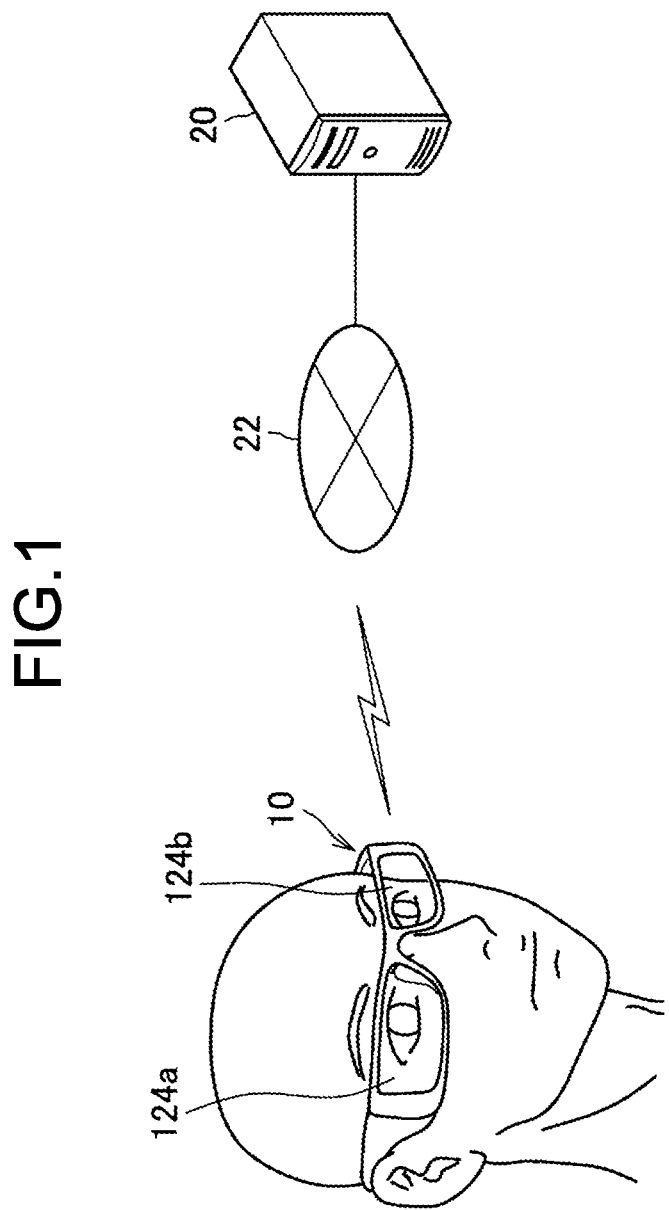
FIG. 1 is a view illustrating a configuration example of an information processing system common to each of embodiments of the present disclosure.

Hereinafter, preferred embodiments of the present disclosure will be described in detail with reference to the accompanying drawings. Note that same reference numerals are given to components having substantially a same functional configuration, and redundant description will be omitted in the present specification and the drawings.

Furthermore, in this specification and the drawings, a plurality of components having substantially the same functional configuration will be distinguished by giving the same reference numerals followed by different alphabets in some cases. For example, a plurality of components having substantially the same functional configuration will be distinguished as necessary, such as a virtual object 30a and a virtual object 30b. However, in a case where there is no need to particularly distinguish each of a plurality of components having substantially the same functional configuration, a same reference numeral alone will be attached. For example, in a case where there is no need to particularly distinguish the virtual object 30a and the virtual object 30b, these objects are simply referred to as the virtual object 30.

In addition, the "mode for carrying out the invention" will be described in accordance with the following item order.

1. Configuration of information processing system
2. First Embodiment
3. Second Embodiment
4. Hardware configuration
5. Modifications In the following, an information processing apparatus 10-1 according to a first embodiment of the present disclosure, and an information processing apparatus 10-2 according to a second embodiment of the present disclosure are collectively referred to as the information processing apparatus 10 in some cases.

1. Configuration of Information Processing System

First, a configuration example of an information processing system common to each of embodiments of the present disclosure will be described with reference to FIG. 1. As illustrated in FIG. 1, the information processing system according to each of embodiments includes an information processing apparatus 10, a server 20, and a communication network 22.

<1-1. Information Processing Apparatus 10>

The information processing apparatus 10 is an apparatus that controls display of content including a virtual object. For example, the information processing apparatus 10 causes a display unit 124 described below to display the content. Examples of the content include AR content or VR content.

As illustrated in FIG. 1, the information processing apparatus 10 can be a head-mounted device including the display unit 124. For example, the information processing apparatus 10 may be an AR glass, a video see-through head mounted display (HMD), or a shielded HMD.

Figure 2:
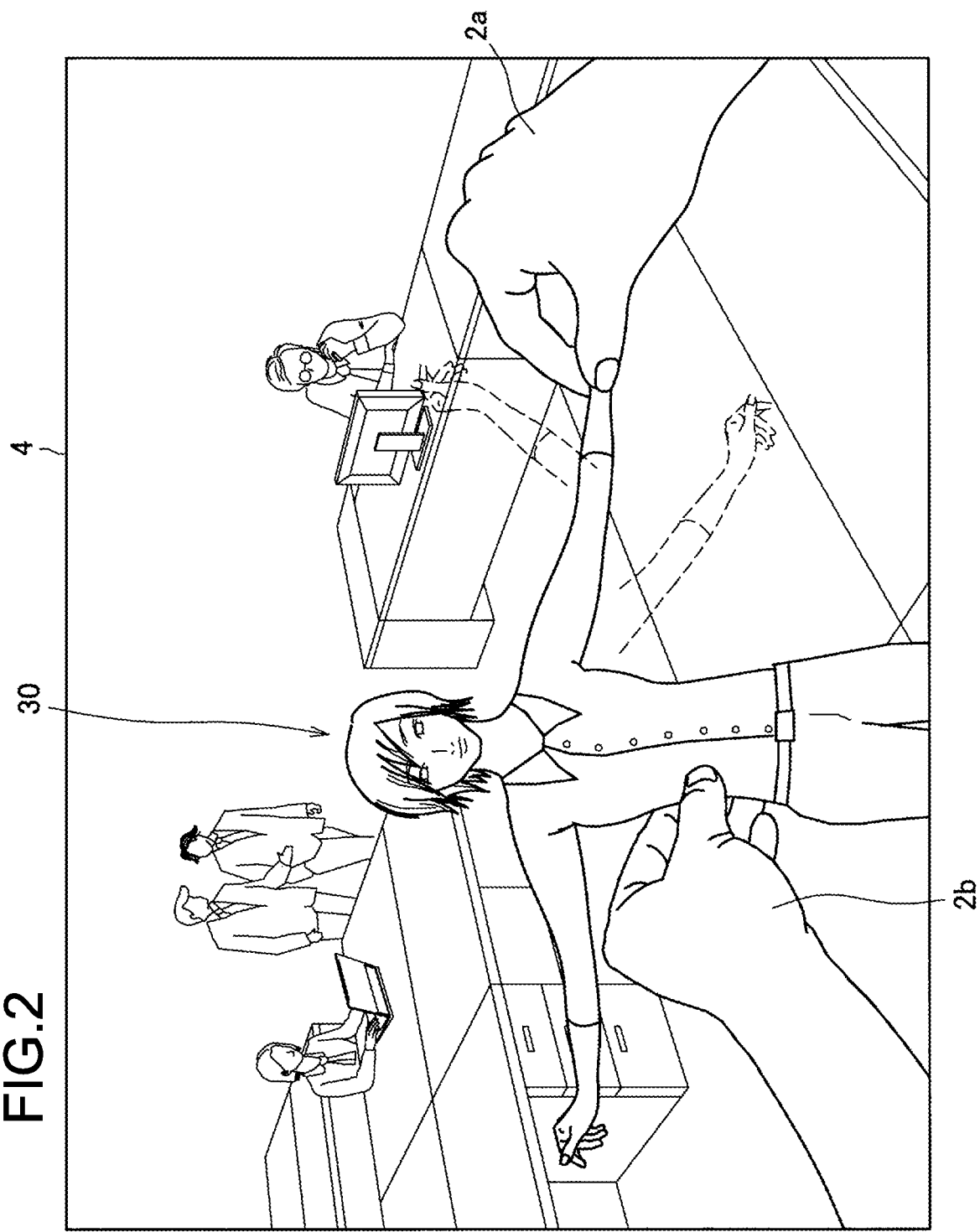
FIG. 2 is a view illustrating a display example of a virtual object on a display unit 124.

FIG. 2 is a view illustrating a display example of AR content 4 on the display unit 124. As illustrated in FIG. 2, the information processing apparatus 10 is capable of displaying a virtual object 30 on the display unit 124 while making it possible to view real objects (for example, a user's hand 2) around the user wearing the information processing apparatus 10. Furthermore, the information processing apparatus 10 is also capable of determining the contact between the virtual object and individual real objects on the basis of position information of the virtual object 30 in the real space corresponding to the display position of the virtual object 30 and position information of each of the real objects in the real space. This allows the user to bring the left and right hands 2 into contact with the virtual object 30 to move the position and the posture of the virtual object 30, for example.

<1-2. Server 20>

The server 20 is a device that manages various types of content (AR content, VR content, or the like). Furthermore, the server 20 is capable of communicating with another device via the communication network 22. For example, the server 20 receives a content acquisition request from the information processing apparatus 10, and transmits content corresponding to the acquisition request to the information processing apparatus 10.

<1-3. Communication Network 22>

The communication network 22 is a wired or wireless transmission path for information transmitted from a device connected to the communication network 22. For example, the communication network 22 may include a public line network such as a telephone line network, the Internet, a satellite communication network, various local area networks (LANs) including the Ethernet (registered trademark), a wide area network (WAN), or the like. The communication network 22 may include a dedicated line network such as an Internet Protocol-Virtual Private Network (IP-VPN).

The configuration of the information processing system common to each of embodiments has been described above. As described below, the information processing apparatus 10 according to each of embodiments can acquire position information of the virtual object displayed on the display unit 124 in the real space, position information of the first real object associated with the user, and position information of the second real object in the real space, and can change the posture of the virtual object on the basis of a posture change rule corresponding to the relationship between the position information of the virtual object, the position information of the first real object, and the position information of the second real object. Here, the position information of the virtual object in the real space may be the same as the position information in the real space corresponding to the display position of the virtual object on the display unit 124.

2. First Embodiment

First, a first embodiment will be described. The first embodiment assumes a situation in which a user changes the posture of a virtual object using movements of the left and right hands. In the first embodiment, the virtual object is assumed to be configured as data having a plurality of fixed parts and a movable part provided for each of two adjacent fixed parts to rotatably connect the two adjacent fixed parts. For example, the fixed part may be a rigid body, and the movable part may be a joint. As an example, the virtual object is configured using a rigid body-joint model. Further, the virtual object may be configured using a tree structure indicating a connection relationship between each of these rigid bodies and each of these joints. In the first embodiment, one of the left hand and the right hand of the user is an example of a first real object according to the present disclosure. The other of the left hand and the right hand of the user is an example of a second real object according to the present disclosure.

<2-1. Background>

Next, the background that led to the creation of the first embodiment will be described. For example, as illustrated in FIG. 2, in a situation where a user tries to change the posture of a virtual object using the movement of the left and right hands, the movement of the user's hand is not physically constrained during operation (unlike a case where the user changes the posture of the real object by hand, for example). Therefore, the posture of the virtual object might be changed to a posture not intended by the user, due to the reason that the user's hand deviates from the position intended by the user, for example.

Figure 3A:
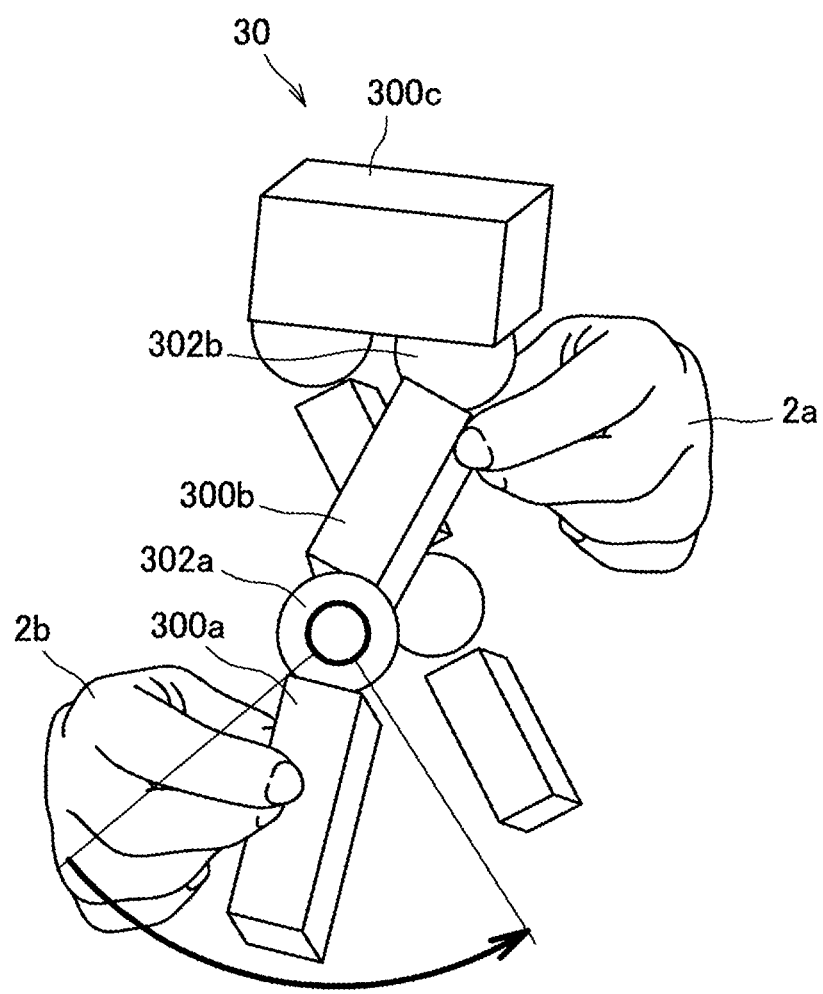
FIG. 3A is a view illustrating a problem of a first embodiment.
Figure 3B:
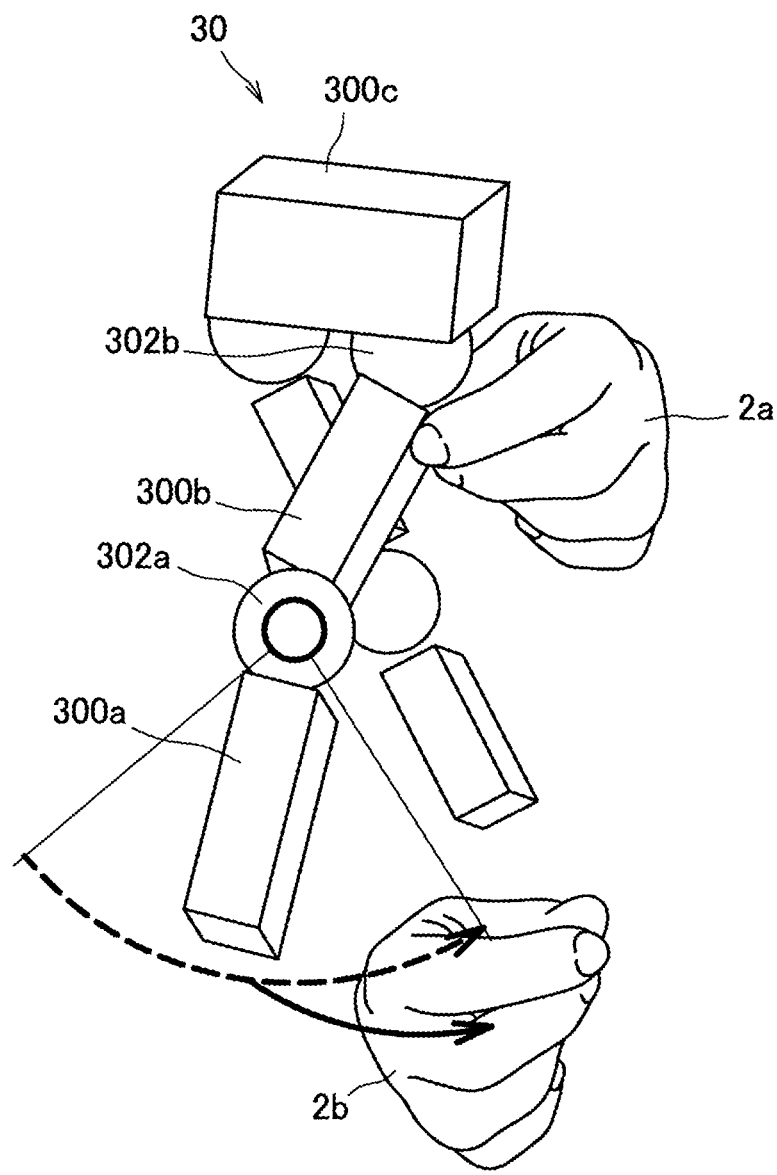
FIG. 3B is a view illustrating a problem of the first embodiment.

Here, the above will be described in more detail with reference to FIGS. 3A to 3D. FIGS. 3A to 3D are views illustrating an example in which the user changes the posture of the virtual object 30 by hand. As illustrated in FIG. 3A, it is assumed that the user first holds a rigid body 300a included in the virtual object 30 with a right hand 2b and holds a rigid body 300b with a left hand 2a. At this point, it is assumed that the user desires to change the posture of the virtual object 30 (more specifically, the posture of the rigid body 300a) to the posture illustrated in FIG. 3C, for example. Next, as illustrated in FIG. 3B, it is assumed that the user moves the right hand 2b along a solid arrow illustrated in FIG. 3B while maintaining the posture of the right hand 2b in the posture holding the rigid body 300a.

Figure 3C:
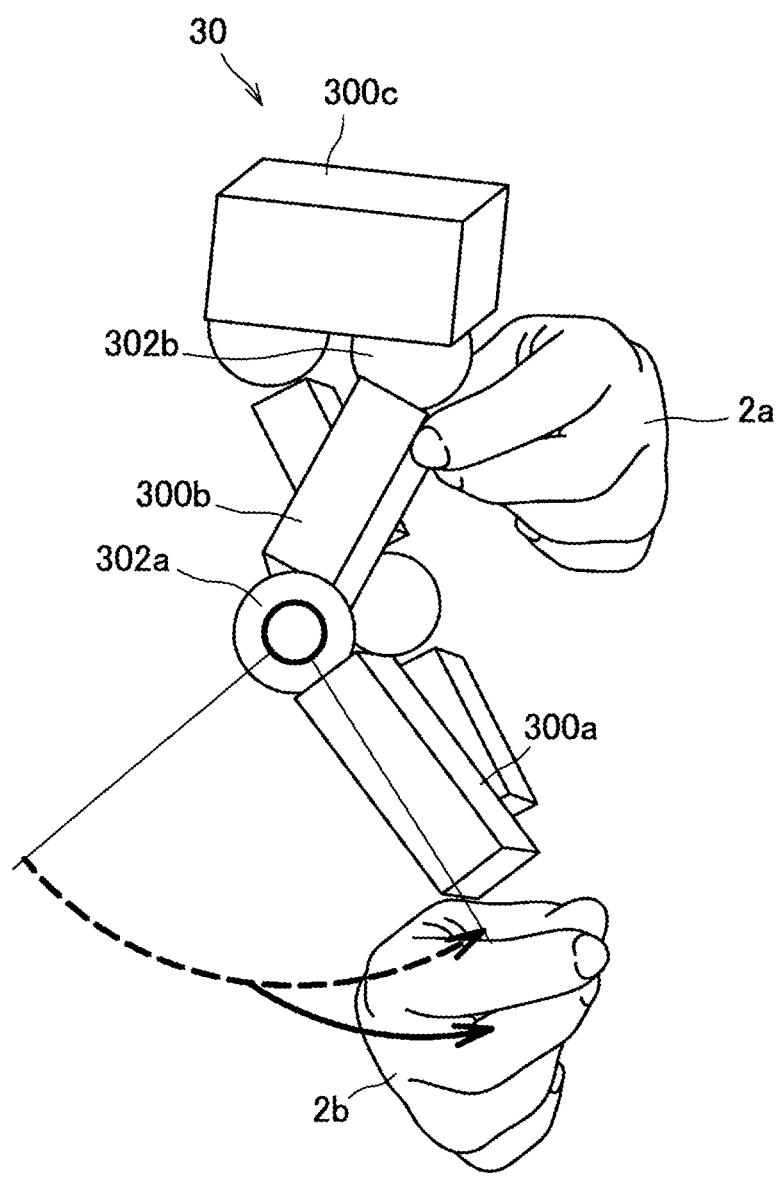
FIG. 3C is a view illustrating a problem of the first embodiment.
Figure 3D:
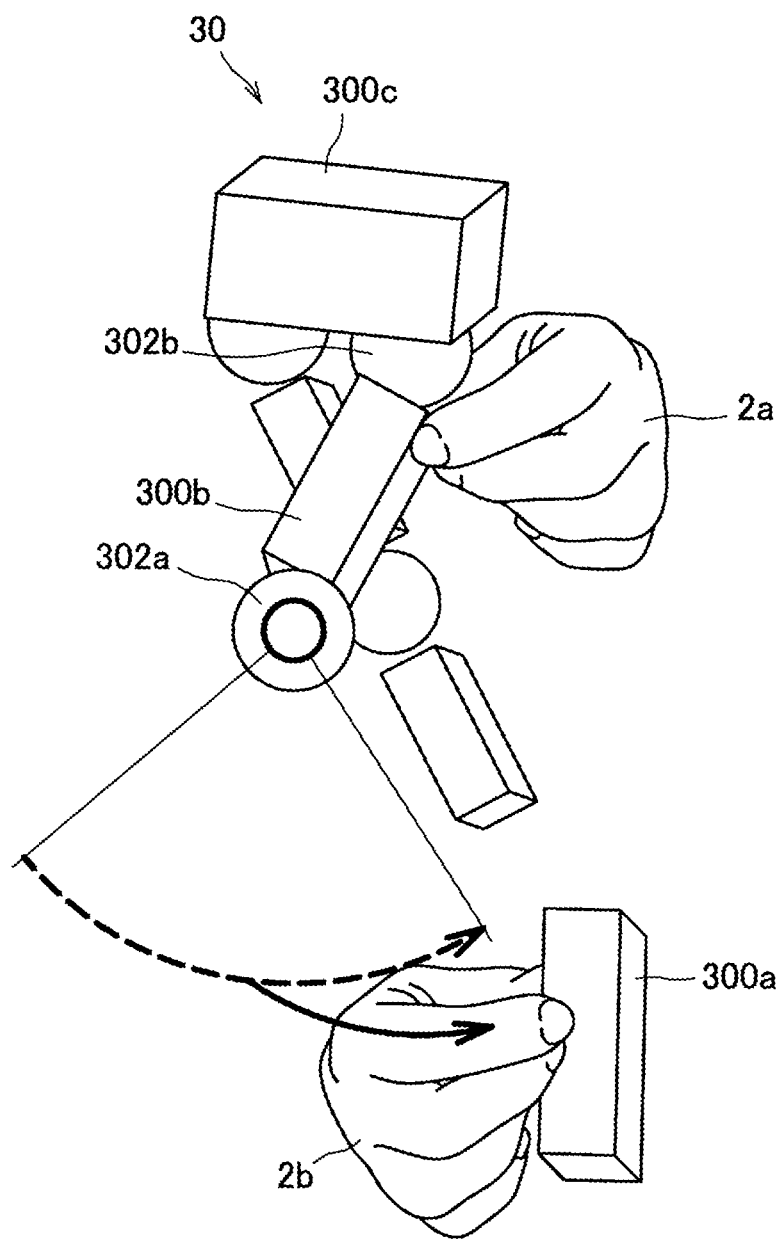
FIG. 3D is a view illustrating a problem of the first embodiment.

However, as described above, since the movement of the user's hand is not constrained at the time of operation, for example, as illustrated in FIG. 3C, the actual position of the right hand 2b might deviate from the position of the rigid body 300a intended by the user. In such a case, with a known technique, for example, as illustrated in FIG. 3D, the position of the rigid body 300a can follow the actual position of the right hand 2b. As a result, the position and posture of the rigid body 300a change differently from the user's intention, leading to a change in the posture of the virtual object 30 to the posture not intended by the user.

As will be described below, according to the first embodiment, it is possible to change the posture of the virtual object as intended by the user in a situation where the user changes the posture of the virtual object using the movement of the left and right hands.

<2-2. Configuration>

Next, a configuration according to the first embodiment will be described. FIG. 4 is a functional block diagram illustrating a configuration example of the information processing apparatus 10-1 according to the first embodiment. As illustrated in FIG. 4, the information processing apparatus 10-1 includes a control unit 100, a communication unit 120, a sensor unit 122, a display unit 124, and a storage unit 126.

{2-2-1. Sensor Unit 122}

The sensor unit 122 can include, for example, a camera (image sensor), a depth sensor (e.g., a time-of-flight method sensor, a structured light method sensor, or a stereo camera, etc.), a microphone, an acceleration sensor, a gyroscope, a geomagnetic sensor, and/or, a global positioning system (GPS) receiver.

For example, a camera included in the sensor unit 122 captures an image in front of the information processing apparatus 10-1. The depth sensor included in the sensor unit 122 senses a distance to each of real objects located in front of the information processing apparatus 10-1.

{2-2-2. Control Unit 100}

The control unit 100 may include a processing circuit such as a central processing unit (CPU) 150 and a graphics processing unit (GPU) described below. The control unit 100 integrally controls operation of the information processing apparatus 10. As illustrated in FIG. 4, the control unit 100 further includes a recognition unit 102, an information acquisition unit 104, and a display control unit 106.

{2-2-3. Recognition Unit 102}

The recognition unit 102 performs various types of recognition processing on the basis of a result of sensing by the sensor unit 122. For example, the recognition unit 102 performs image recognition on an image captured by the sensor unit 122. The recognition unit 102 further recognizes the type (for example, a user's hand), position, posture, or the like of each of real objects existing in the real space on the basis of the image recognition result.

{2-2-4. Information Acquisition Unit 104}

The information acquisition unit 104 performs reception or read-out processing and thereby acquires the position information of the virtual object displayed on the display unit 124 in the real space, the position information of the user's left hand, and the position information of the user's right hand For example, the information acquisition unit 104 specifies the position information the left hand of the user and the position information of the right hand of the user in the real space on the basis of the recognition result obtained by the recognition unit 102 and the depth information sensed by the sensor unit 122, and thereby acquires the left hand position information and the right hand position information. Furthermore, the information acquisition unit 104 specifies (or acquires) position information in the real space corresponding to the current display position of the virtual object on the display unit 124, and then acquires the specified (or acquired) position information as position information of the virtual object within the real space.

{2-2-5. Display Control Unit 106}

The display control unit 106 controls display of a virtual object onto the display unit 124. For example, the display control unit 106 changes the posture of the virtual object on the basis of posture change rules corresponding to the relationship between the position information of the virtual object, the position information of the user's left hand, and the position information of the user's right hand, acquired by the information acquisition unit 104. Furthermore, every time the posture of the virtual object is changed, the display control unit 106 causes the display unit 124 to display the virtual object after the change.

For example, the display control unit 106 changes the posture of the virtual object in accordance with the change in the position of the right or left hand after determination that both the right hand and the left hand of the user have come in contact with the virtual object. As an example, the display control unit 106 first determines one or more joints of the virtual object as posture change targets on the basis of the relationship between the contact position of the right hand on the virtual object when it is determined that the right hand has come in contact with the virtual object and the contact position of the left hand on the virtual object when it is determined that the left hand has come in contact with the virtual object. Subsequently, the display control unit 106 changes the posture of the one or more joints as posture change targets in accordance with the change in the position of the right hand or left hand of the user after the determination of the one or more joints as posture change targets, and thereby changes the posture of the virtual object.

More specifically, the display control unit 106 may fix the posture of one of the rigid bodies included in the virtual object together with determining one or more joints as posture change targets. Additionally, the display control unit 106 may change the one or more joints as posture change targets in accordance with the change in the position of the rigid body fixed in the posture and the change in the position of the right hand or left hand of the user after the determination of the one or more joints as posture change targets, and may thereby change the posture of the virtual object. Note that regarding a rigid body whose posture is fixed, the posture fixed state of the rigid body can be released after the posture of the virtual object is changed.

The rigid body whose posture is fixed can be determined as follows. For example, the display control unit 106 may fix the posture of only the rigid body (a rigid body 300c in the example illustrated in FIG. 5A described below) held at a first time by the user, or may fix the posture of only the rigid body (rigid body 300a in the example illustrated in FIG. 5B described below) held at a latter time by the user. Alternatively, the display control unit 106 may fix the posture of only the rigid body closer to the root rigid body (for example, the rigid body of the waist of the virtual object) among the rigid body held at the first time by the user and the rigid body held at the latter time by the user.

(2-2-5-1. Example of Determining Joints as Posture Change Targets)

Here, an example of determining the "one or more joints as posture change targets" will be described in detail with reference to FIGS. 5A to 7B.

Determination Example 1

Figure 5A:
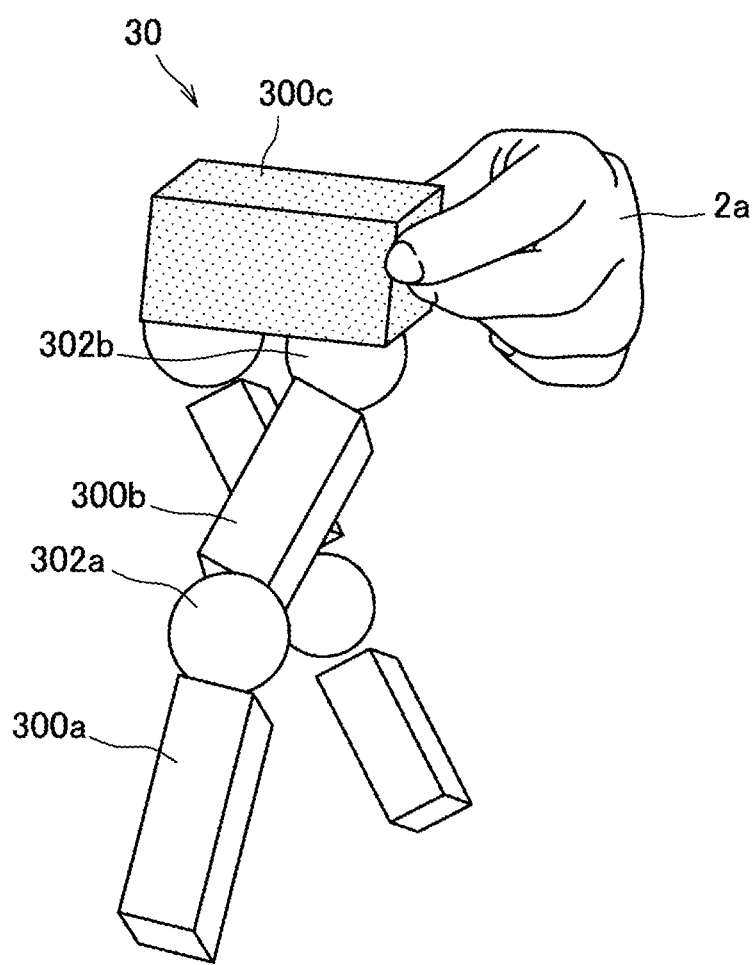
FIG. 5A is a view illustrating an example of determining one or more joints as posture change targets according to the first embodiment.
Figure 5B:
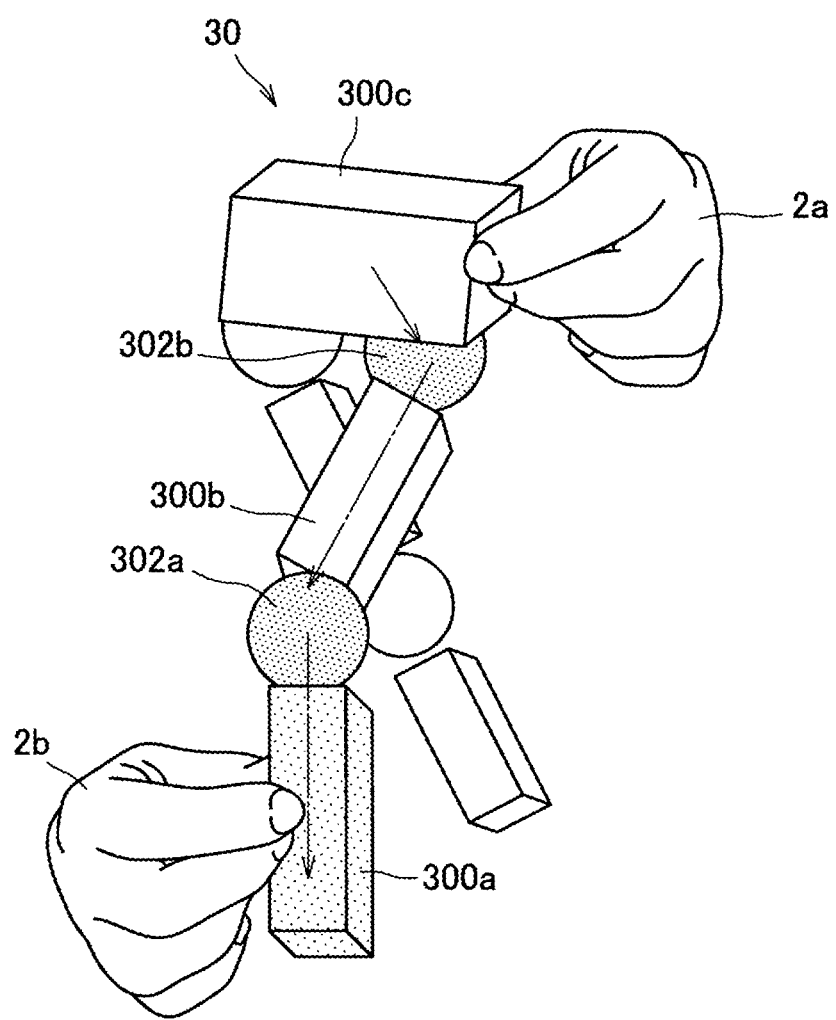
FIG. 5B is a view illustrating an example of determining one or more joints as posture change targets according to the first embodiment.

For example, the display control unit 106 can determine all the joints located in a range from the rigid body held by one hand to the rigid body held by the other hand among the plurality of rigid bodies included in the virtual object, as one or more joints as posture change targets. As an example, as illustrated in FIG. 5A, it is assumed that the user first holds with the left hand 2a the rigid body 300c among a plurality of rigid bodies 300 included in the virtual object 30. Thereafter, as illustrated in FIG. 5B, it is assumed that the user holds another rigid body 300a with the right hand 2b. In this case, the display control unit 106 may determine all joints 302 (a joint 302a and a joint 302b in the example illustrated in FIG. 5B) located within a range from the rigid body 300c to the rigid body 300a, as one or more joints as posture change targets.

Determination Example 2

Alternatively, the display control unit 106 may determine the one or more joints as posture change targets on the basis of whether a predetermined rigid body is present in one or more rigid bodies on a path connecting a first rigid body held by one hand and a second rigid body held by the other hand. For example, in a case where the predetermined rigid body is present in one or more rigid bodies on the path, the display control unit 106 determines all the joints located in a range from a rigid body farther from the predetermined rigid body among the first rigid body and the second rigid body, to the predetermined rigid body, as one or more joints as posture change targets. In contrast, in a case where the predetermined rigid body is absent in one or more rigid bodies on the path, the display control unit 106 determines all the joints located in a range from the first rigid body to the second rigid body, as the one or more joints as posture change targets. Here, an example of the predetermined rigid body is a root rigid body (a rigid body at the waist of the virtual object, or the like).

Figure 6A:
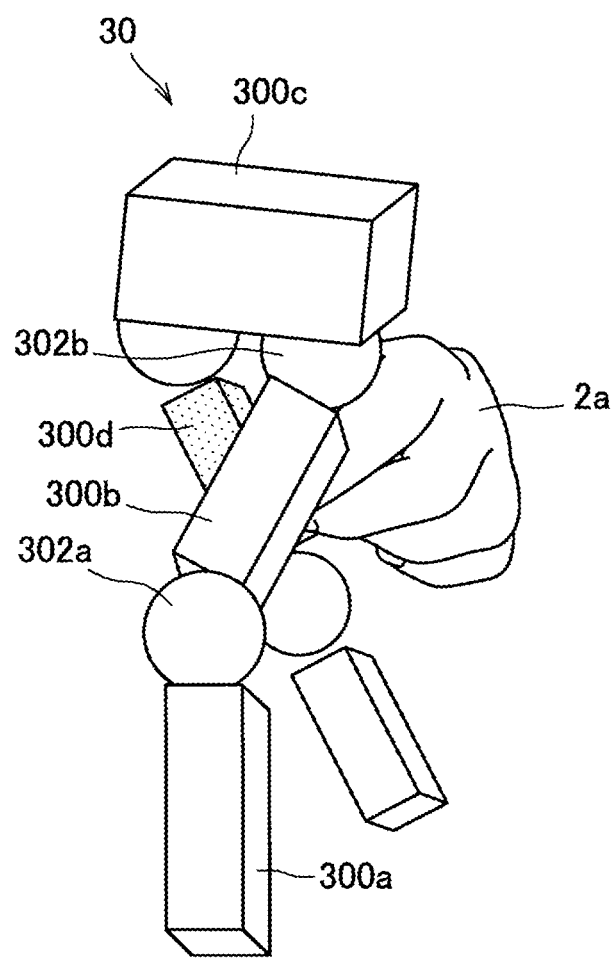
FIG. 6A is a view illustrating an example of determining one or more joints as posture change targets according to the first embodiment.
Figure 6B:
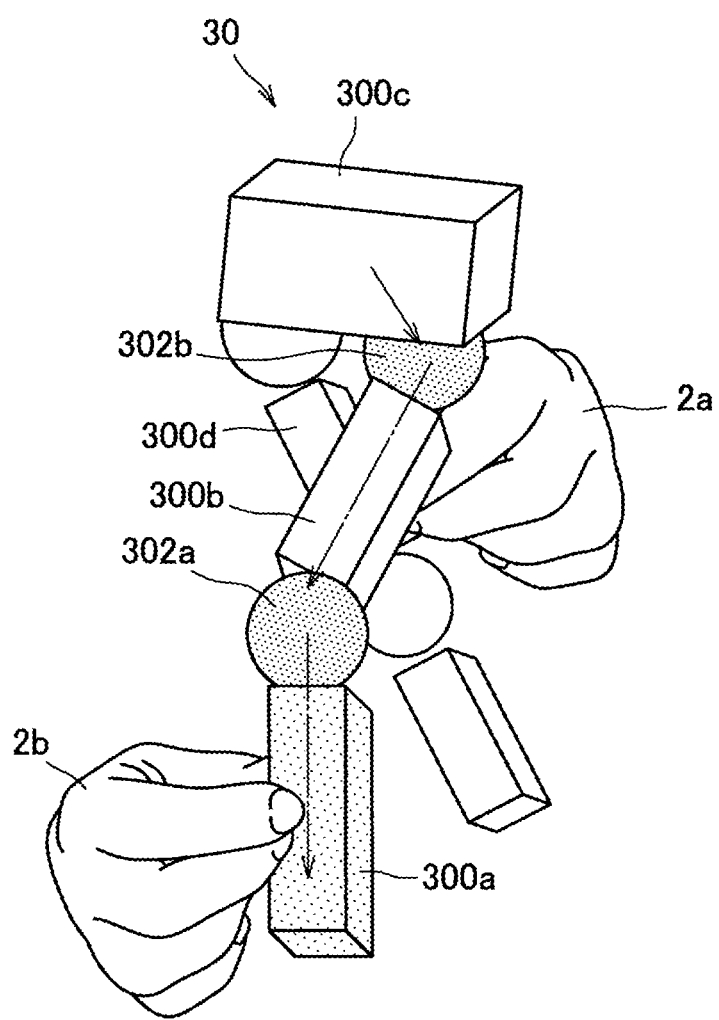
FIG. 6B is a view illustrating an example of determining one or more joints as posture change targets according to the first embodiment.

Here, the above-described functions will be described in more detail with reference to FIGS. 6A and 6B. The examples illustrated in FIGS. 6A and 6B assume that the rigid body 300c is a root rigid body. For example, as illustrated in FIG. 6A, it is assumed that the user first holds, with the left hand 2a, the rigid body 300d among the plurality of rigid bodies 300 included in the virtual object 30. Thereafter, as illustrated in FIG. 6B, it is assumed that the user holds another rigid body 300a with the right hand 2b. In this case, the root rigid body 300c exists on a path connecting the rigid body 300d with the rigid body 300a. Moreover, the rigid body 300a is farther from the rigid body 300c, among the rigid body 300d and the rigid body 300a. Accordingly, the display control unit 106 may determine all joints 302 (the joint 302a and the joint 302b in the example illustrated in FIG. 6B) located within the range from the rigid body 300a to the root rigid body 300c, as one or more joints as posture change targets.

Determination Example 3

Alternatively, the display control unit 106 may determine all the joints located within a range from the first rigid body designated by the user as the rigid body whose posture is fixed to the second rigid body held by the user after the designation, as the one or more joints as posture change targets. Here, the method of designating the first rigid body may be, for example, touching the rigid body continuously with a fingertip of an arbitrary finger (such as an index finger) for a predetermined time or more, or may be operation of pinching the rigid body with fingers.

Figure 7A:
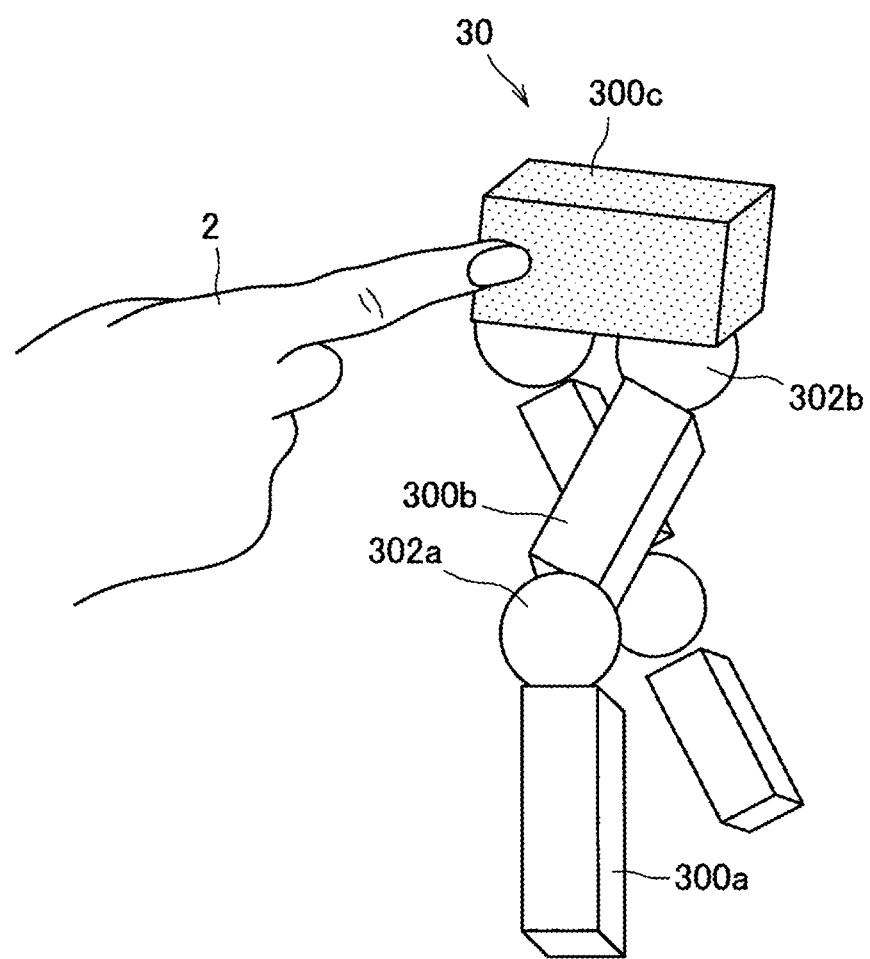
FIG. 7A is a view illustrating an example of determining one or more joints as posture change targets according to the first embodiment.
Figure 7B:
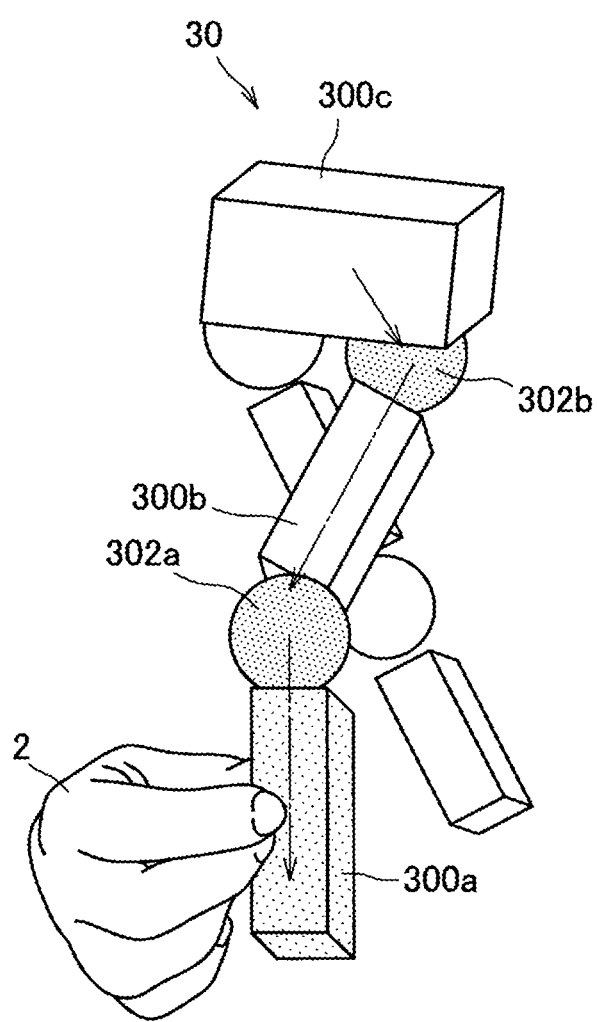
FIG. 7B is a view illustrating an example of determining one or more joints as posture change targets according to the first embodiment.

As an example, as illustrated in FIG. 7A, it is assumed that the user first allows a finger to come in contact with the rigid body 300c to designate the rigid body 300c as a rigid body whose posture is to be fixed, among the plurality of rigid bodies 300 included in the virtual object 30. This operation can fix the posture of the rigid body 300c. Thereafter, as illustrated in FIG. 7B, it is assumed that the user holds another rigid body 300a with one hand 2. In this case, the display control unit 106 may determine all joints 302 (the joint 302a and the joint 302b in the example illustrated in FIG. 7B) located within the range from the rigid body 300c to the rigid body 300a, as one or more joints as posture change targets.

(2-2-5-2. Example of Changing Posture of Joints as Posture Change Targets)

Next, a specific example regarding the above "change of posture of one or more joints as posture change targets" will be described with reference to FIGS. 8A to 10D.

For example, the display control unit 106 can change the posture of the virtual object by changing the rotation angle of each of the one or more joints as posture change targets in accordance with a change in the position of the right hand or the left hand after the determination of the one or more joints as posture change targets.

Figure 8A:
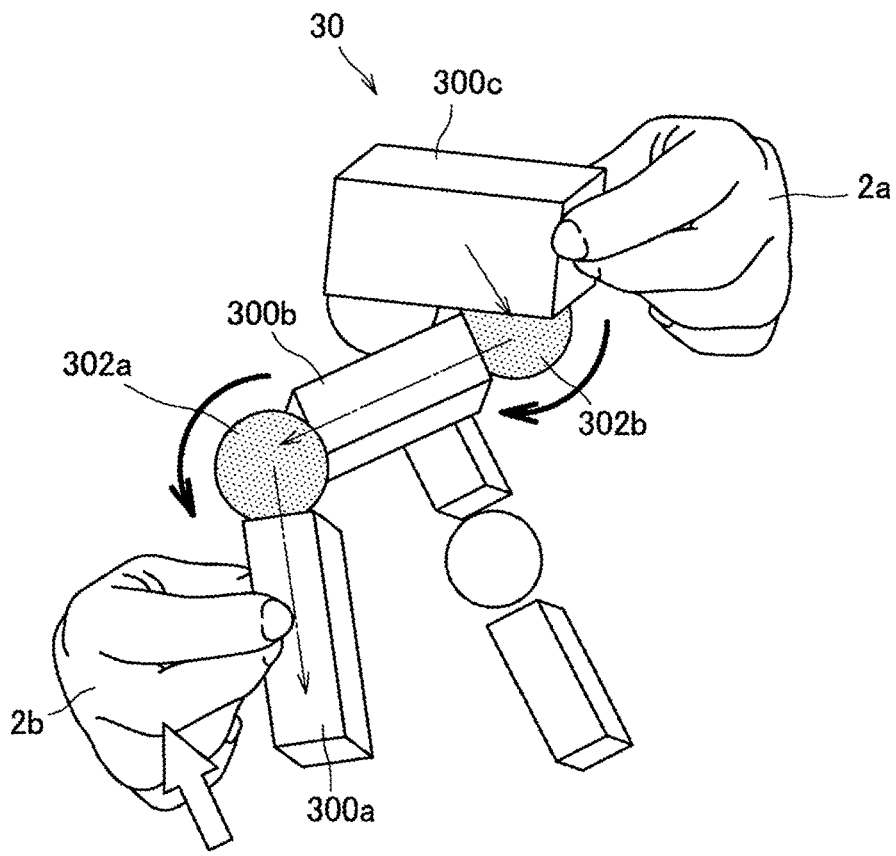
FIG. 8A is a view illustrating an example of changing a posture of one or more joints as posture change targets according to the first embodiment.

As an example, it is assumed that after the time point illustrated in FIG. 5B, the position of right hand 2b is moved in the upper left direction of FIG. 8A while the position and posture of left hand 2a are maintained as illustrated in FIG. 8A. In this case, as illustrated in FIG. 8A, the display control unit 106 may change the posture of the virtual object 30 by changing the rotation angle of each of all the joints 302 as posture change targets (that is, the joint 302a and the joint 302b) in accordance with the change in the position of the right hand 2b. With this configuration, the position and the posture of the rigid body 300a (and the rigid body 300b) can be appropriately changed in accordance with the change in the position of the right hand 2b while the position and the posture of the rigid body 300c are fixed.

Figure 8B:
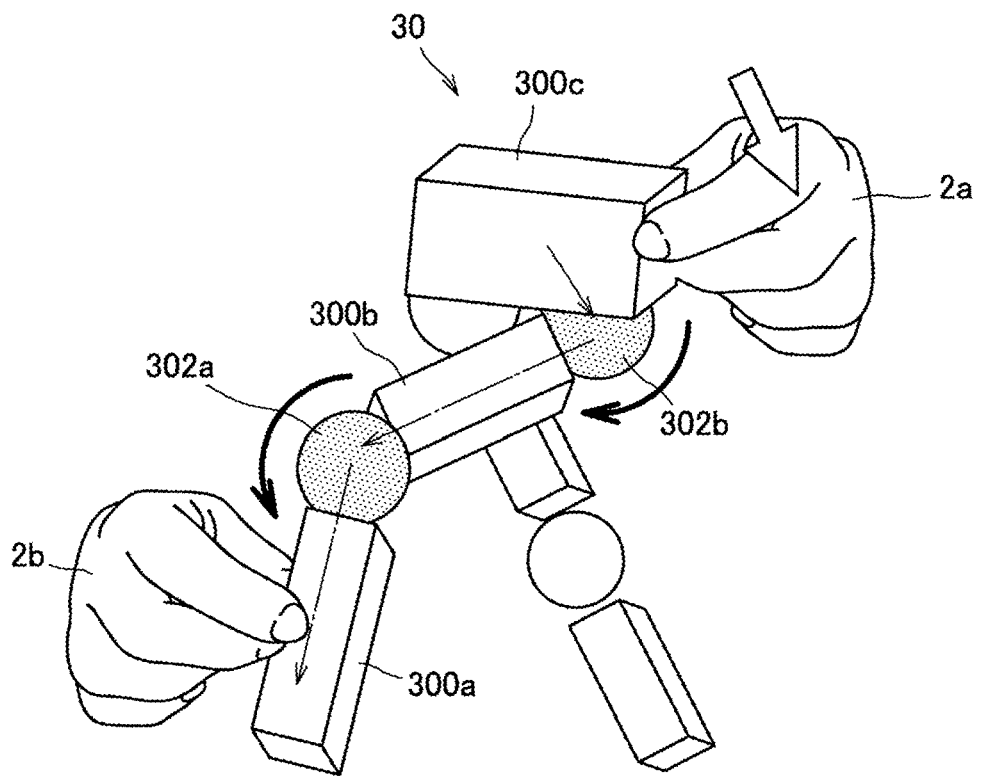
FIG. 8B is a view illustrating an example of changing a posture of one or more joints as posture change targets according to the first embodiment.

Now, it is assumed that after the time point illustrated in FIG. 5B, the position of left hand 2a is moved in the lower right direction of FIG. 8B while the position and posture of right hand 2b are maintained as illustrated in FIG. 8B. In this case, as illustrated in FIG. 8B, the display control unit 106 may change the posture of the virtual object 30 by changing the rotation angle of each of all the joints 302 as posture change targets (that is, the joint 302a and the joint 302b) in accordance with the change in the position of the left hand 2a. With this configuration, the position and the posture of the rigid body 300c (and the rigid body 300b) can be appropriately changed in accordance with the change in the position of the left hand 2a while the position and the posture of the rigid body 300a are fixed. Note that other joints and other rigid bodies connected to the rigid body 300c can move in a fixed manner with respect to changes in the position and posture of the rigid body 300c (that is, movable in accompany).

Hereinafter, the above-described posture change example will be described in more detail. For example, the display control unit 106 can change the rotation angle of each of one or more joints as posture change targets on the basis of whether the number of all the joints of the posture change target is just one.

Example of Change 1

As an example, in a case where the number of all the joints as posture change targets is just one and the user's right hand or left hand is moved after determination of all the joints as posture change targets, the display control unit 106 may change the rotation angle of the joint so that the rigid body that is just in contact with the moved hand immediately before the movement faces the position of the hand after the movement.

Figure 9A:
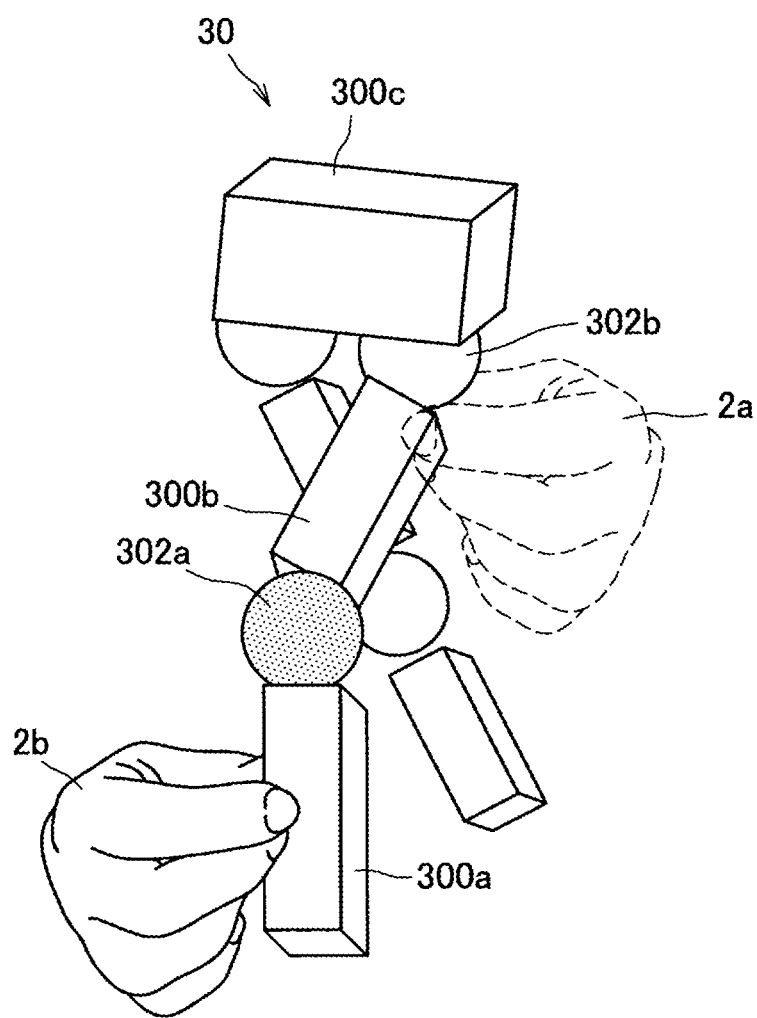
FIG. 9A is a view illustrating an example of changing a posture of one or more joints as posture change targets according to the first embodiment.
Figure 9B:
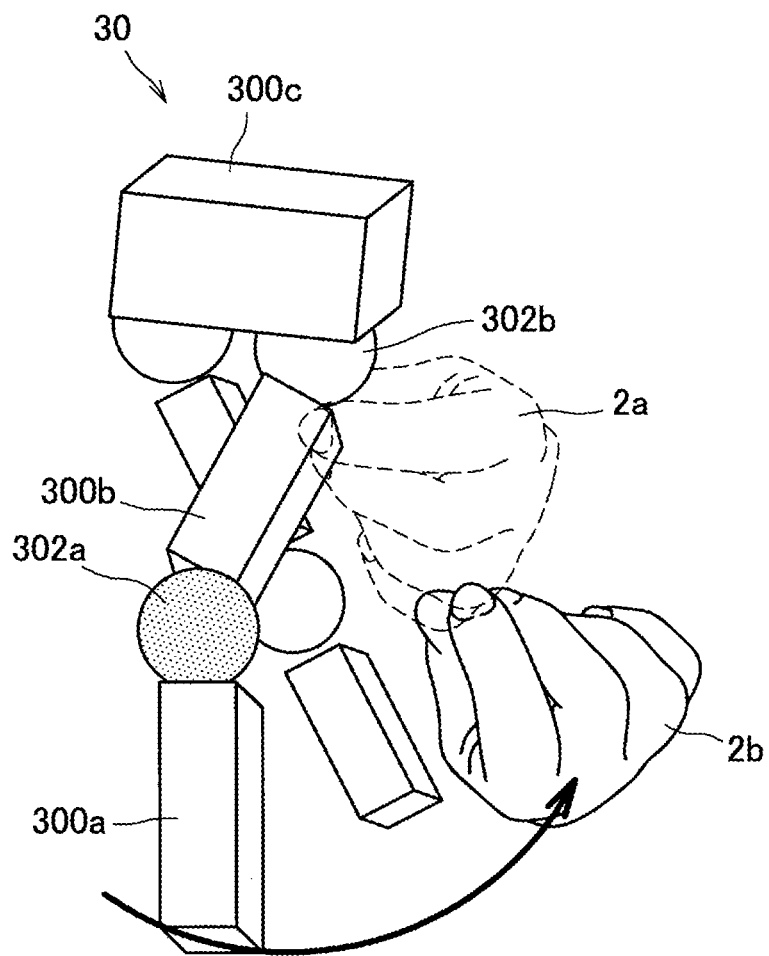
FIG. 9B is a view illustrating an example of changing a posture of one or more joints as posture change targets according to the first embodiment.
Figure 9C:
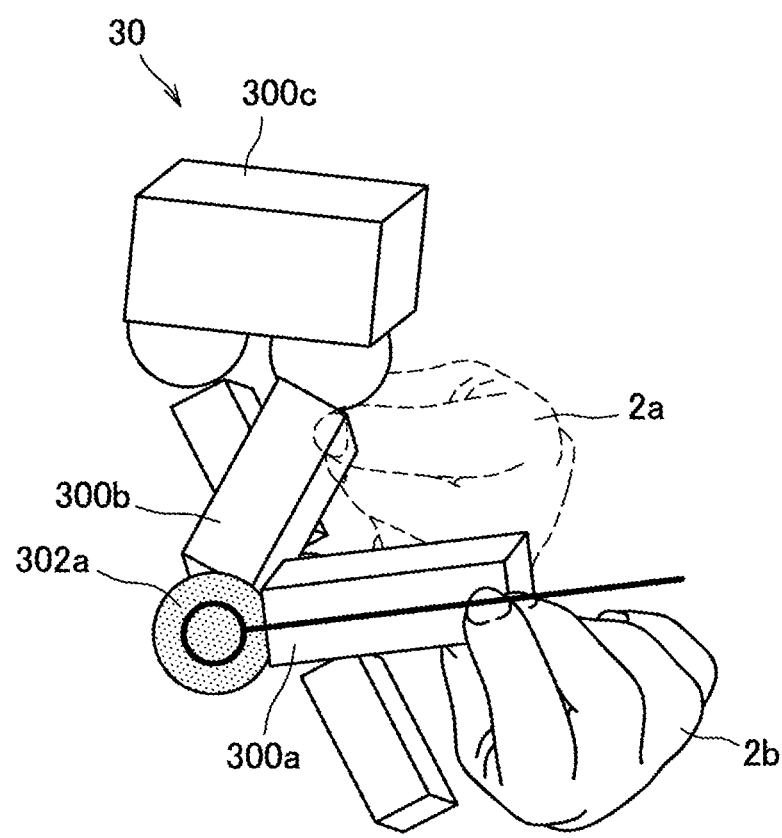
FIG. 9C is a view illustrating an example of changing a posture of one or more joints as posture change targets according to the first embodiment.

Here, the example of change will be described in detail with reference to FIGS. 9A to 9C. In the example illustrated in FIGS. 9A to 9C, it is assumed that the joint 302a alone has been determined as the joint 302 as a posture change target. At the time of determining the joint 302a to be a posture change target, it is assumed, as illustrated in FIG. 9A, that the user holds one rigid body 300a adjacent to the joint 302a with the right hand 2b, and holds the other rigid body 300b adjacent to the joint 302a with the left hand 2a. It is assumed that the user thereafter moves the position of the right hand 2b as indicated by the arrow illustrated in FIG. 9B. In this case, as illustrated in FIG. 9C, the display control unit 106 may change the rotation angle of the joint 302a so that the rigid body 300a (held by the right hand 2b) faces the position of the right hand 2b after the movement.

Example of Change 2

Furthermore, in a case where the number of all the joints as posture change targets is plural, and the user's right hand or left hand is moved after determination of all the joints as posture change targets, the display control unit 106 may change the rotation angle of the each of all joints as posture change targets so that the rigid body that is just in contact with the moved hand immediately before the movement faces the position of the hand after the movement.

Figure 10A:
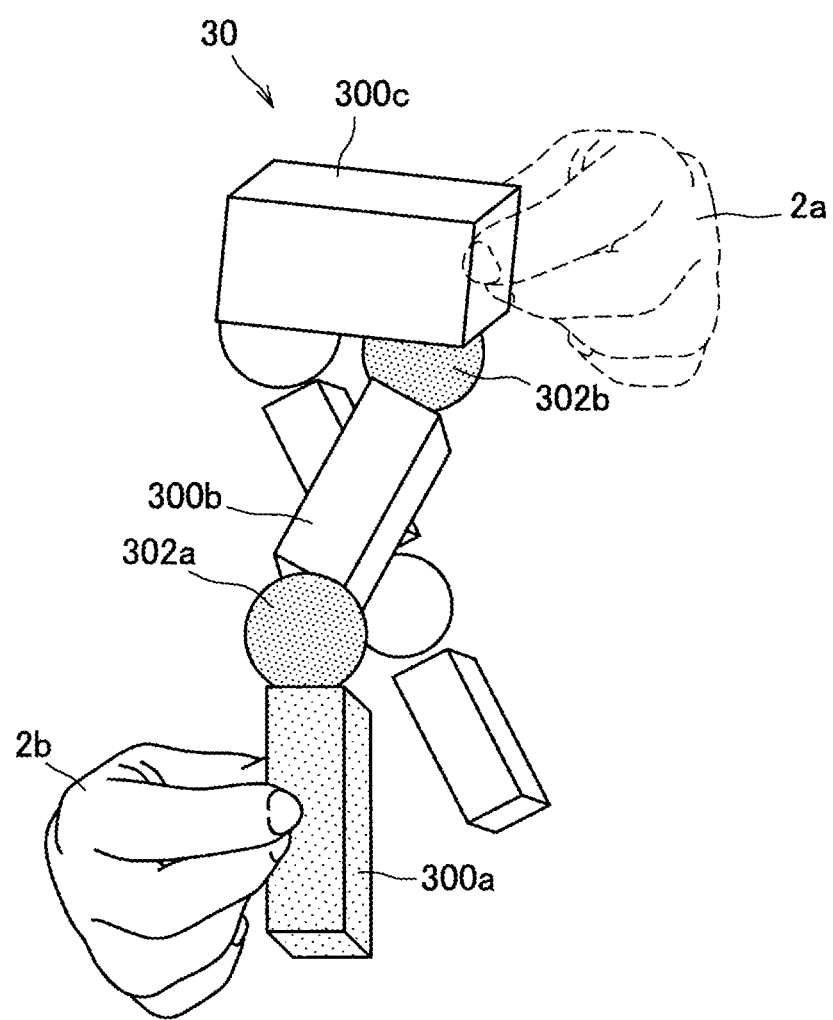
FIG. 10A is a view illustrating an example of changing a posture of one or more joints as posture change targets according to the first embodiment.
Figure 10B:
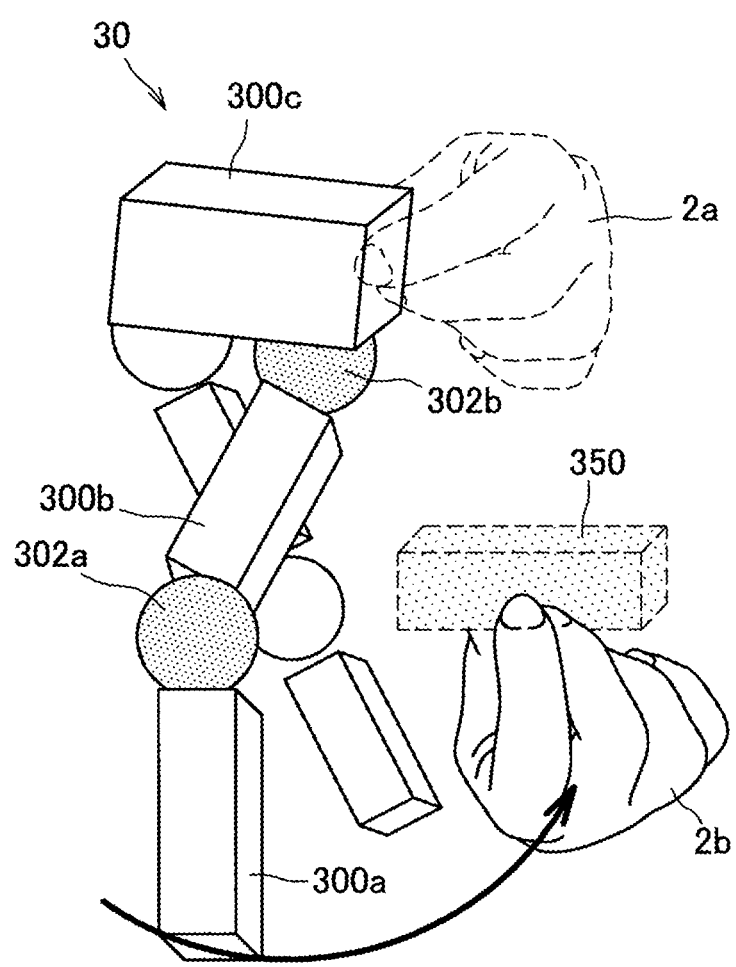
FIG. 10B is a view illustrating an example of changing a posture of one or more joints as posture change targets according to the first embodiment.

Here, the example of change will be described in detail with reference to FIGS. 10A to 10D. In the examples illustrated in FIGS. 10A to 10D, it is assumed that the joint 302a and the joint 302b have been determined as the joints 302 as posture change targets. At the time of determination of all the joints 302 as posture change targets, as illustrated in FIG. 10A, it is assumed that the user holds, with the right hand 2b, the rigid body 300a on an outer side adjacent to the joint 302a at one end of all the joints 302 as posture change targets, and that the user holds, with the left hand 2a, the rigid body 300c on an outer side adjacent to the joint 302b. It is assumed that the user thereafter moves the position of the right hand 2b as illustrated in FIG. 10B. In this case, as illustrated in FIG. 10B, first, the display control unit 106 can determine that a virtual rigid body 350 corresponding to the rigid body 300a has moved while maintaining the relative relationship with the movement of the right hand 2b. Subsequently, the display control unit 106 repeats execution of a first change process illustrated in FIG. 10C and a second change process illustrated in FIG. 10D until both the first change process and the second change process converge, and thereby can change the rotation angles of all the joints 302 as posture change targets. The virtual rigid body 350 may be a virtual rigid body having the same size as the rigid body 300a.

Figure 10C:
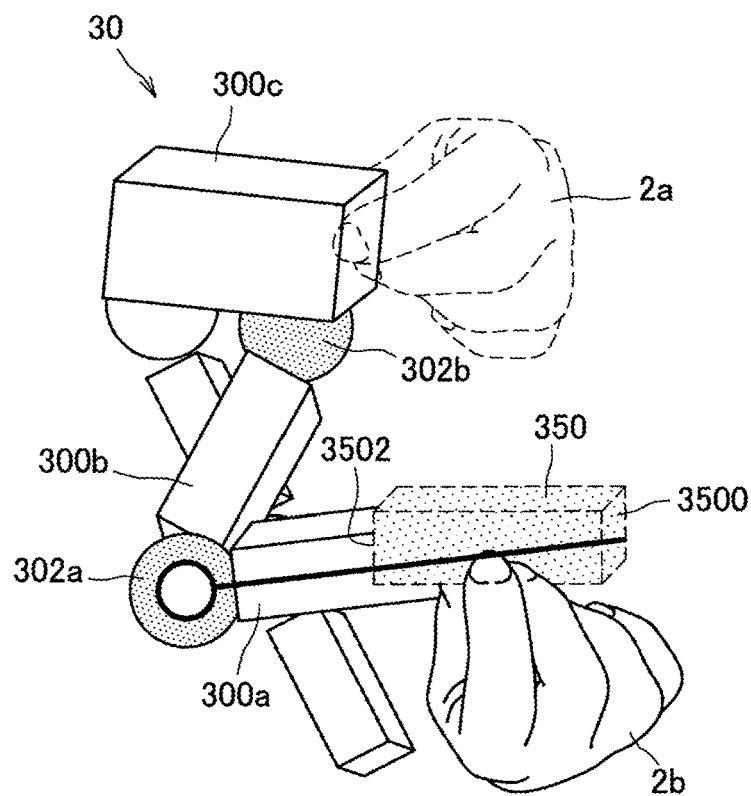
FIG. 10C is a view illustrating an example of changing a posture of one or more joints as posture change targets according to the first embodiment.
Figure 10D:
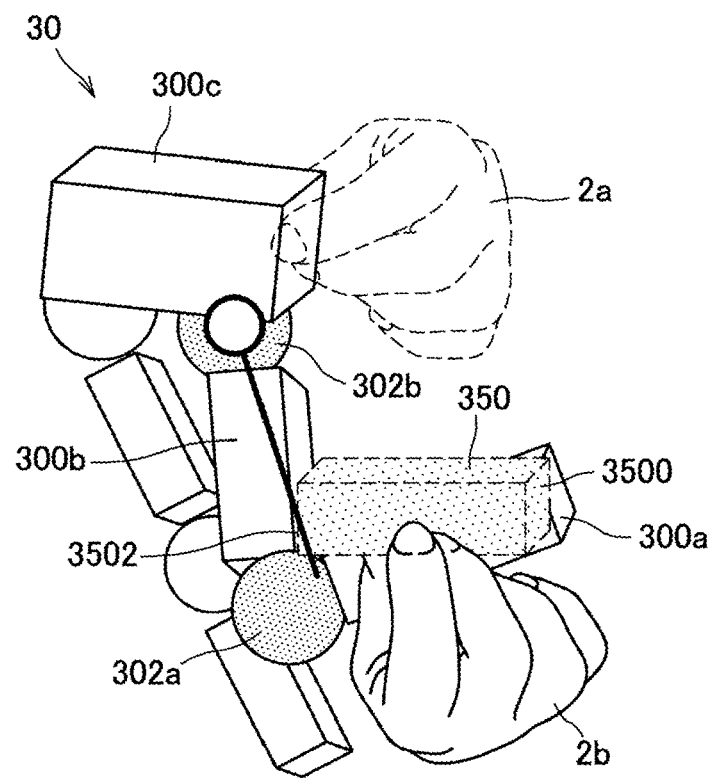
FIG. 10D is a view illustrating an example of changing a posture of one or more joints as posture change targets according to the first embodiment.

For example, in the first change process, as illustrated in FIG. 10C, the display control unit 106 may gradually change the rotation angle of the joint 302a closest to the position of the virtual rigid body 350 so that the rigid body 300a (corresponding to the virtual rigid body 350) faces an end 3500 of the virtual rigid body 350 that is farther from the virtual object 30. Furthermore, in the second change process, as illustrated in FIG. 10D, the display control unit 106 may change the rotation angle of each of joints 302 other than the joint 302a (joint 302b in the example illustrated in FIG. 10D) among all joints 302 as posture change targets, targeted at the position of an end 3502 of the virtual rigid body 350 closer to the virtual object 30, on the basis of a known algorithm of inverse kinematics. With this configuration, when both the first change process and the second change process converge, the posture of the virtual object 30 can be changed such that the posture of the rigid body 300a held by the right hand 2b approaches the posture of the virtual rigid body 350 as much as possible, and each of all the rigid bodies 300 located within the range from the rigid body 300a to the rigid body 300c is connected smoothly.

<2-2-5-3. Modification>

As a modification, in a case where it is determined that each of the left hand and the right hand of the user has come in contact with the virtual object displayed on the display unit 124, the display control unit 106 may cause the display unit 124 to display an image indicating the state of being in contact (for example, a specific effect) in association with the contact position.

As another modification, in a case where the content in use is VR content, the display control unit 106 may cause the display unit 124 to display a virtual left hand image corresponding to the user's left hand and a virtual right hand image corresponding to the user's right hand.

As another modification, when a virtual object is displayed on the display unit 124, the display control unit 106 may further cause the display unit 124 to display an image of each of rigid bodies and an image of each of joints included in the virtual object, superimposed on the virtual object, for example.

{2-2-6. Communication Unit 120}

The communication unit 120 may include a communication device 166 described below, for example. The communication unit 120 transmits and receives various types of information to and from other devices via the communication network 22, for example, under the control of the control unit 100.

{2-2-7. Display Unit 124}

The display unit 124 can include an output device 162 described below, for example. For example, the display unit 124 may include a transmissive display device (for example, a projector). In this case, under the control of the display control unit 106, the display unit 124 can project an image on a projection surface using at least a part of regions of each of a right-eye lens and a left-eye lens (or goggle-type lenses) included in the information processing apparatus 10-1.

Alternatively, the display unit 124 may include a non-transmissive display device (for example, a liquid crystal display (LCD) or an organic light emitting diode (OLED) or the like). In this case, the display unit 124 may sequentially display images in front of the information processing apparatus 10-1 captured by the sensor unit 122 (camera), under the control of the display control unit 106.

{2-2-8. Storage Unit 126}

The storage unit 126 can include a storage device 164 described below, for example. The storage unit 126 stores various types of data and software.

<2-3. Process Flow>

The configuration of the first embodiment has been described above. Next, an example of a process flow according to the first embodiment will be described with reference to FIGS. 11 and 12.

Figure 11:
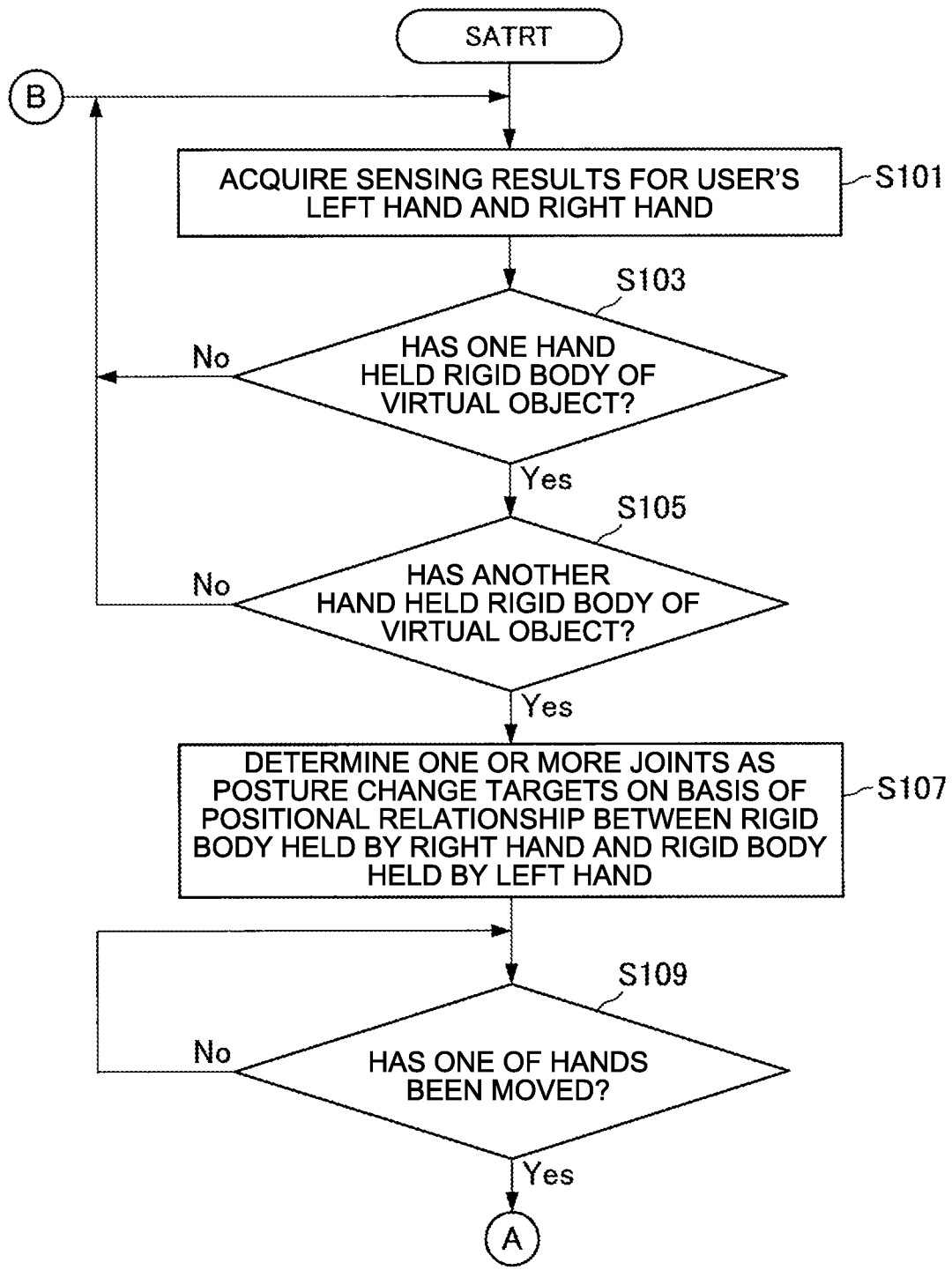
FIG. 11 is a flowchart illustrating a part of a process flow according to the first embodiment.

As illustrated in FIG. 11, first, the sensor unit 122 of the information processing apparatus 10-1 acquires an image and depth information in front of the information processing apparatus 10-1. Subsequently, the recognition unit 102 performs image recognition on the captured image. Subsequently, the information acquisition unit 104 acquires user's left hand position information and user's right hand position information in real space on the basis of the result of image recognition for the captured image and the sensed depth information (S101).

Subsequently, the display control unit 106 determines whether one hand of the user holds one of the plurality of rigid bodies included in the virtual object displayed on the display unit 124 on the basis of the position information acquired in S101 (S103). In a case where it is determined that no hand of the user holds any of the rigid bodies (S103: No), the control unit 100 repeats the processing of S101 to S103.

In contrast, in a case where it is determined that one hand of the user is holding one of the rigid bodies (S103: Yes), then the display control unit 106 determines whether the other hand of the user is holding another rigid body on the basis of the position information acquired in S101 (S105). In a case where it is determined that the other hand is not holding any of the rigid bodies (S105: No), the control unit 100 repeats the processing of S101 to S105.

In contrast, in a case where it is determined that the other hand is holding one of the rigid bodies (S105: Yes), the display control unit 106 then determines one or more joints as posture change targets among the virtual objects on the basis of a positional relationship between the rigid body held by one hand of the user and the rigid body held by the other hand of the user (S107).

Subsequently, the display control unit 106 waits until one of the left and right hands moves on the basis of the result of sensing of user's left hand and right hand after S107 (S109).

Figure 12:
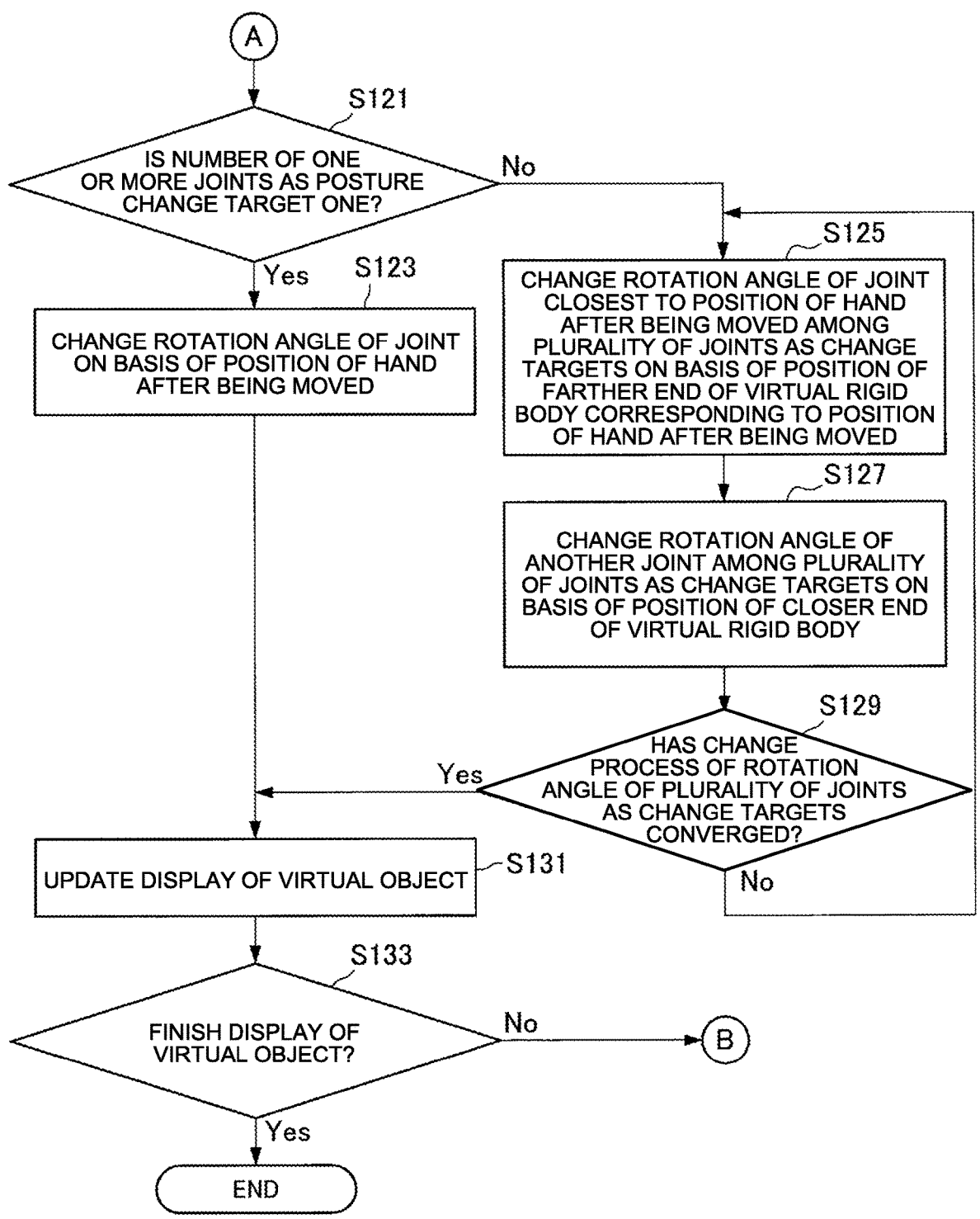
FIG. 12 is a flowchart illustrating a part of a process flow according to the first embodiment.

Here, a process flow in a case where it is determined in S109 that either the left or right hand has moved (S109: Yes) will be described with reference to FIG. 12. As illustrated in FIG. 12, the display control unit 106 first determines whether the number of all the joints as posture change targets determined in S107 is just one (S121).

In a case where the number of all the joints as posture change targets is just one (S121: Yes), the display control unit 106 changes the rotation angle of the joint in accordance with the change in the position of the hand determined to have moved in S109 (S123). Thereafter, the display control unit 106 performs the process of S131 described below.

In contrast, in a case where the number of all the joints as posture change targets is plural (S121: No), the display control unit 106 first forms a virtual rigid body that corresponds to the rigid body held by the hand determined to have moved in S109, on the basis of the current position of the hand. Subsequently, the display control unit 106 changes the rotation angle of the joint closest to the position of the hand on the basis of the position of the farther end of the virtual rigid body (S125). At the same time, the display control unit 106 changes the rotation angle of each of the other joints of all the joints as posture change targets on the basis of a known inverse kinematics algorithm targeting the position of the closer end of the virtual rigid body (S127).

Thereafter, the display control unit 106 determines whether both the process of changing the rotation angle of the target joint in S125 and the change process of the rotation angle of each of target joints in S127 have converged (S129). In a case where at least one of the two change processes has not converged (S129: No), the display control unit 106 repeats the processes of S125 to S129.

In contrast, in a case where both of the two change processes have converged (S129: Yes), the display control unit 106 updates the display of the virtual object (S131). With this configuration, the virtual object whose posture has been changed will be displayed on the display unit 124.

Thereafter, the control unit 100 determines whether the end of the display of the virtual object has been instructed by the user (S133). In a case where the end of the display of the virtual object has been instructed (S133: Yes), the process is finished. In contrast, in a case where the end of the display of the virtual object has not been instructed (S133: No), the information processing apparatus 10-1 repeats the processing from S101 onward.

<2-4. Effects>

{2-4-1. Effect 1}

As described above, the information processing apparatus 10-1 according to the first embodiment changes the posture of the virtual object in accordance with a change in the position of the right or left hand of the user after determination that the right hand and the left hand of the user using the display unit 124 have come in contact with the virtual object displayed by the display unit 124. This makes it possible to change the posture of the virtual object as intended by the user in a situation where the user changes the posture of the virtual object by the movement of the left and right hands.

For example, when a user moves a hand toward a virtual object generated by simulating a real object on the basis of past experience on methods for moving the real object, the user can change the posture of a joint included in the virtual object as intended. Furthermore, the user does not need to learn a dedicated operation method.

In addition, since the information processing apparatus 10-1 does not use physical simulation, there is no need to accurately maintain a force balance between the user's hand and the virtual object. Accordingly, the user can change the posture of the virtual object as intended even when the movement of the hand is somewhat rough.

{2-4-2. Effect 2}

Furthermore, since no physical simulation is used in the first embodiment, it is possible to keep the low calculation cost.

3. Second Embodiment

The first embodiment has been described above. Meanwhile, it is also desired in AR content that a user is capable of moving a virtual object to a desired location in a real space. In such a case, it is desirable that the virtual object is arranged with the posture and shape of the virtual object appropriately changed in accordance with the arrangement location with reduced user's labor.

Next, a second embodiment will be described. As will be described below, according to the second embodiment, it is possible to change the posture of the virtual object appropriately in accordance with the real object in a situation where the user arranges the virtual object on a real object.

The second embodiment has an assumable situation in which the user instructs with one hand to mainly change the position information of a virtual object and arrange the virtual object on a certain real object in the real space. Here, the hand used to instruct the change in the position information of the virtual object is an example of a first object according to the present disclosure. In addition, the real object on which a virtual object is arranged (hereinafter, referred to as a real object as arrangement destination) is an example of a second object according to the present disclosure. For example, the real object as arrangement destination may be an arbitrary real object different from the user or may be a hand different from the hand used to instruct to change the position information of the virtual object.

<3-1. Configuration>

Figure 13:
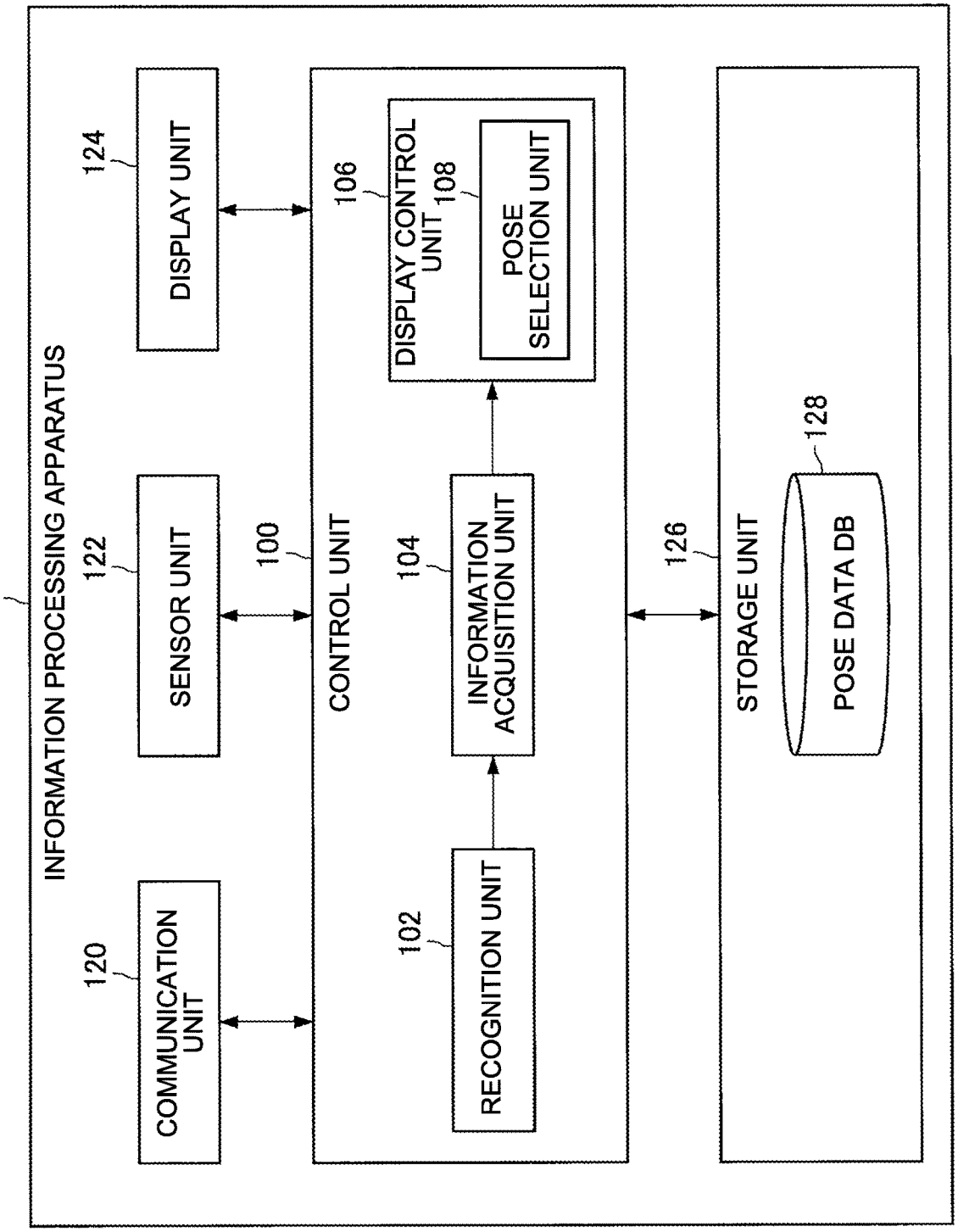
FIG. 13 is a functional block diagram illustrating a configuration example of an information processing apparatus 10-2 according to a second embodiment.

First, a configuration according to the second embodiment will be described. FIG. 13 is a functional block diagram illustrating a configuration example of an information processing apparatus 10-2 according to the second embodiment. As illustrated in FIG. 13, the information processing apparatus 10-2 further includes a pose selection unit 108 as compared with the information processing apparatus 10-1 illustrated in FIG. 4. Hereinafter, components having functions different from those of the first embodiment will be selectively described, and similar description will be omitted.

{3-1-1. Pose Selection Unit 108}

When a virtual object that has been determined not to be in contact with a real object as arrangement destination is moved to be arranged on the real object as arrangement destination, the pose selection unit 108 determines the posture of the virtual object at the time of arrangement to a region including a contact position determined to have been in contact with the virtual object (hereinafter, referred to as an arrangement region) within the real object as arrangement destination, in accordance with the shape of the arrangement region. For example, in this case, the pose selection unit 108 determines the posture of the virtual object at the time of arrangement to the arrangement region in accordance with the shape of the arrangement region, the type of the virtual object, and a height of the hand used to instruct the movement of the virtual object from the contact position of the virtual object in the arrangement region. As an example, in a case where the shape of the arrangement region is a plane and the virtual object is a human-shaped object, the pose selection unit 108 may change the posture of the virtual object so that the virtual object is in a posture standing on the region or a posture sitting on the region in accordance with the height of the hand used to instruct the movement of the virtual object, from the contact position.

For example, in pose data DB 128 to be described below, the pose selection unit 108 can determine the posture associated with such information (that is, the shape of the arrangement region, the type of the virtual object, and the height of the hand used to instruct the movement of the virtual object from the contact position of the virtual object in the arrangement region) as the posture of the virtual object at the time of arrangement in the arrangement region.

(3-1-1-1. Pose Data DB 128)

The pose data DB 128 is a database in which, for each of virtual objects, the shape of the arrangement region and the posture (pose data) of a virtual object when the virtual object is arranged in the arrangement region. For example, in the pose data DB 128, a combination of the type of the virtual object, the shape of the arrangement region, and the instruction information of the height of the virtual object from the arrangement region is associated with the pose data of the virtual object at the time of arrangement in the arrangement region.

Specific Examples

Here, specific examples of the change of the posture of the virtual object will be described with reference to FIGS. 14 to 17. FIGS. 14 to 17 are an example in which the virtual object is a human-shaped object.

Figure 14:
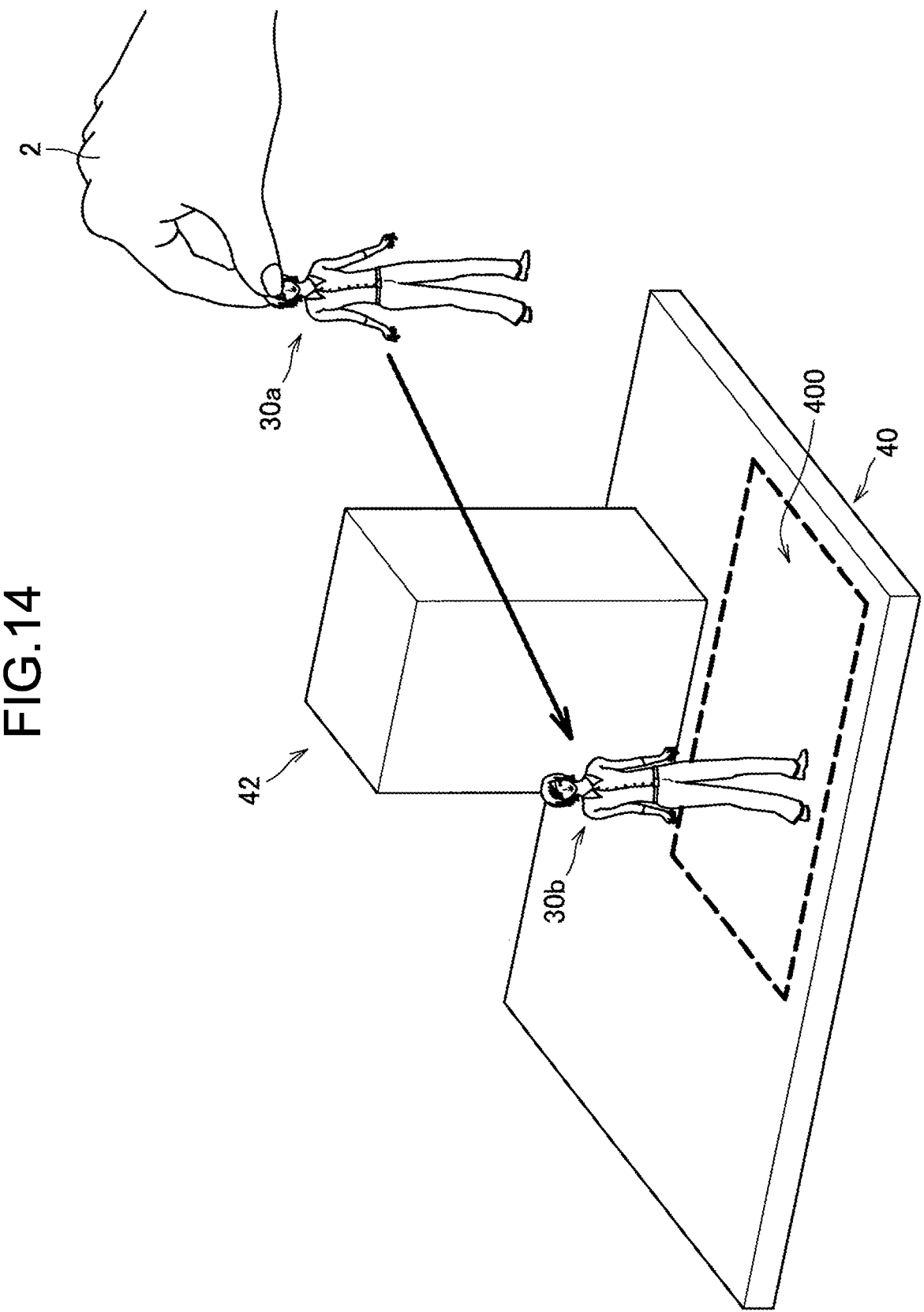
FIG. 14 is a view illustrating an example of changing a posture of a virtual object according to the second embodiment.

For example, as illustrated in FIG. 14, in a case where the virtual object 30 is moved so that the virtual object 30 is arranged on a horizontal plane region 400, the pose selection unit 108 determines the posture in which the virtual object 30 stands on the region 400 as the posture at the time of arrangement.

Figure 15:
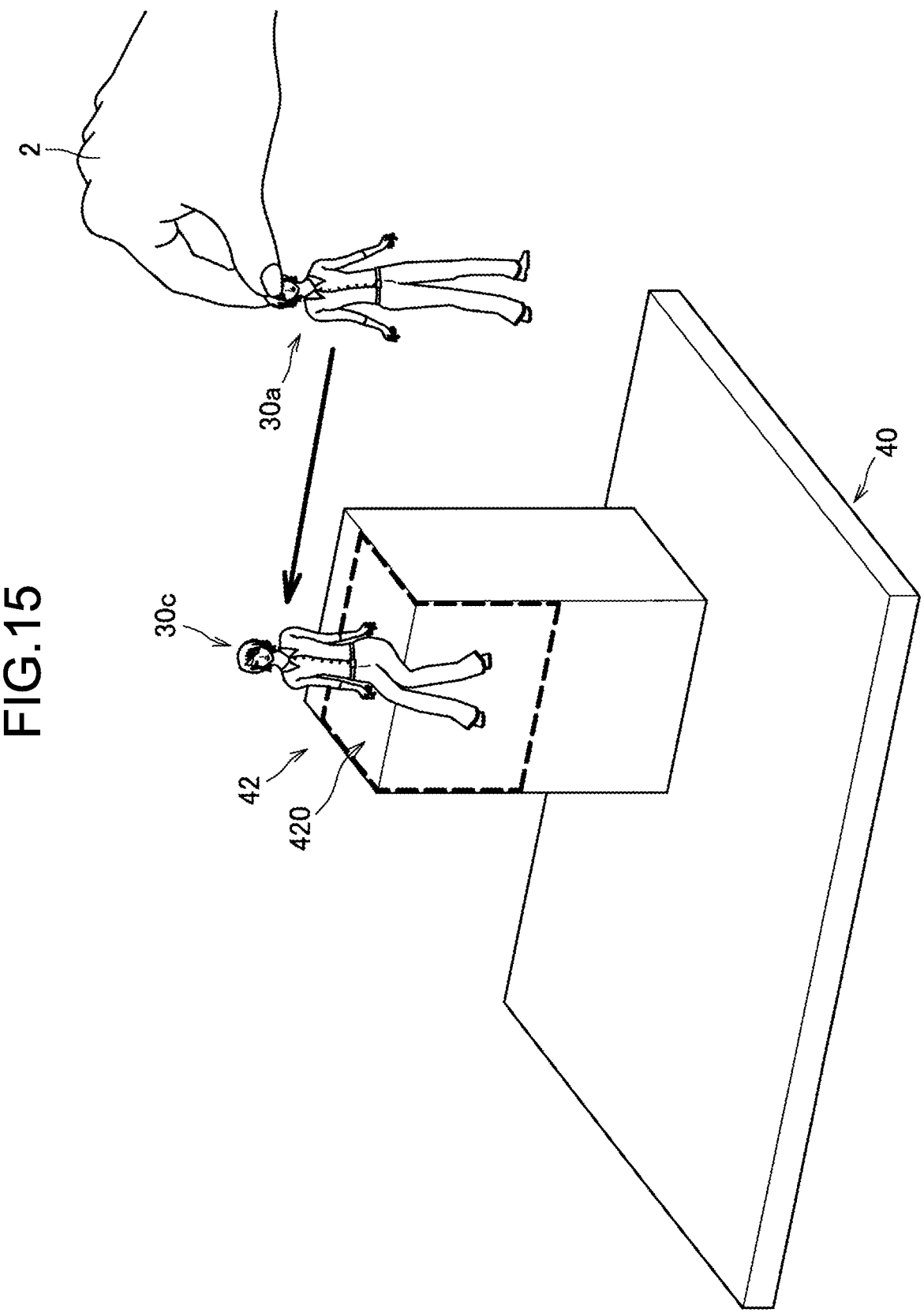
FIG. 15 is a view illustrating an example of changing a posture of a virtual object according to the second embodiment.

Moreover, as illustrated in FIG. 15, in a case where the virtual object 30 is moved so that the virtual object 30 is arranged on an edge 420, the pose selection unit 108 determines the posture in which the virtual object 30 sits on the edge 420 as the posture at the time of arrangement.

Figure 16:
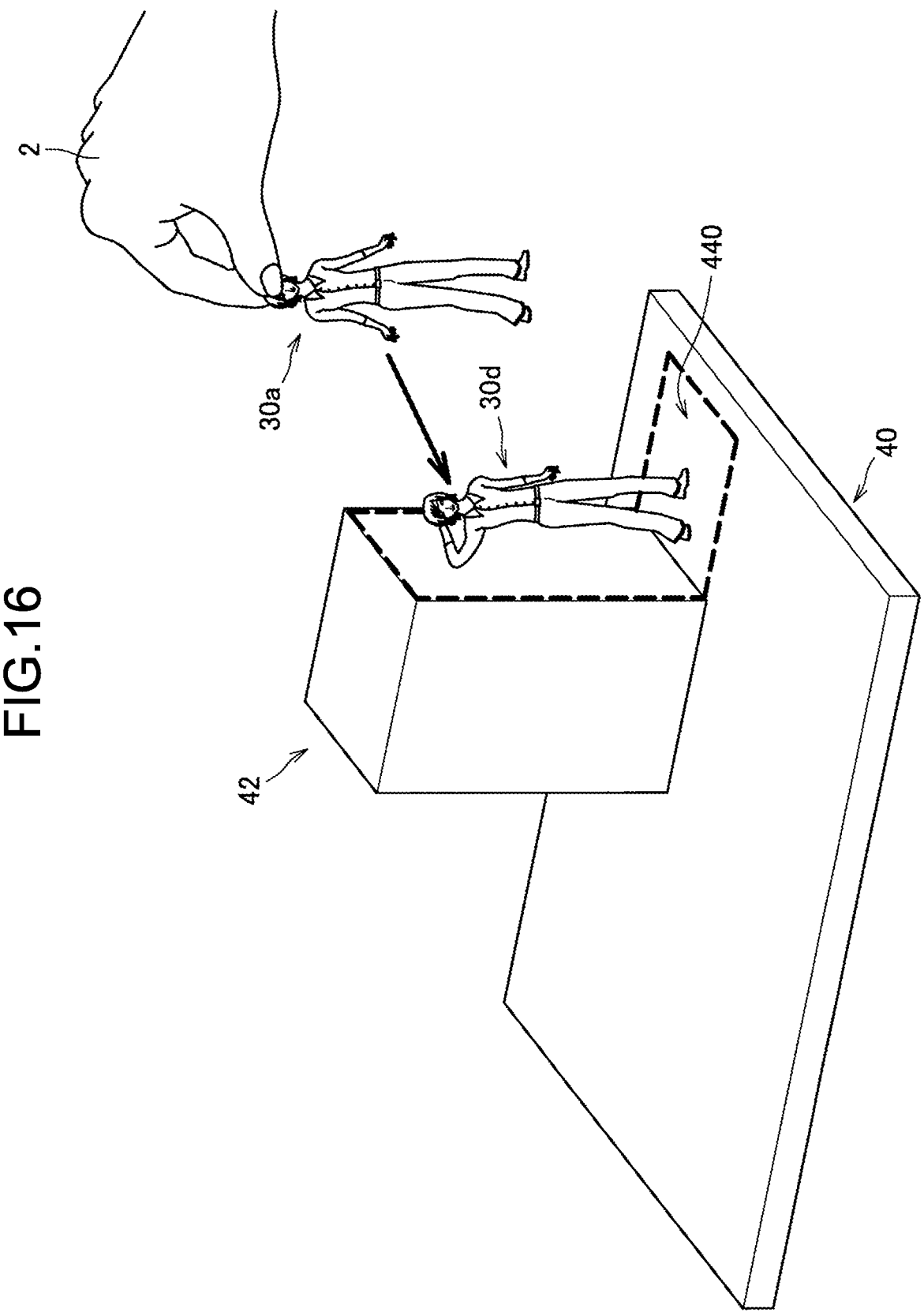
FIG. 16 is a view illustrating an example of changing a posture of a virtual object according to the second embodiment.

Moreover, as illustrated in FIG. 16, in a case where the virtual object 30 is moved so that the virtual object 30 is arranged on an L-shaped region 440, the pose selection unit 108 determines the posture in which the virtual object 30 leans against the L-shaped region 440 as the posture at the time of arrangement.

Figure 17:
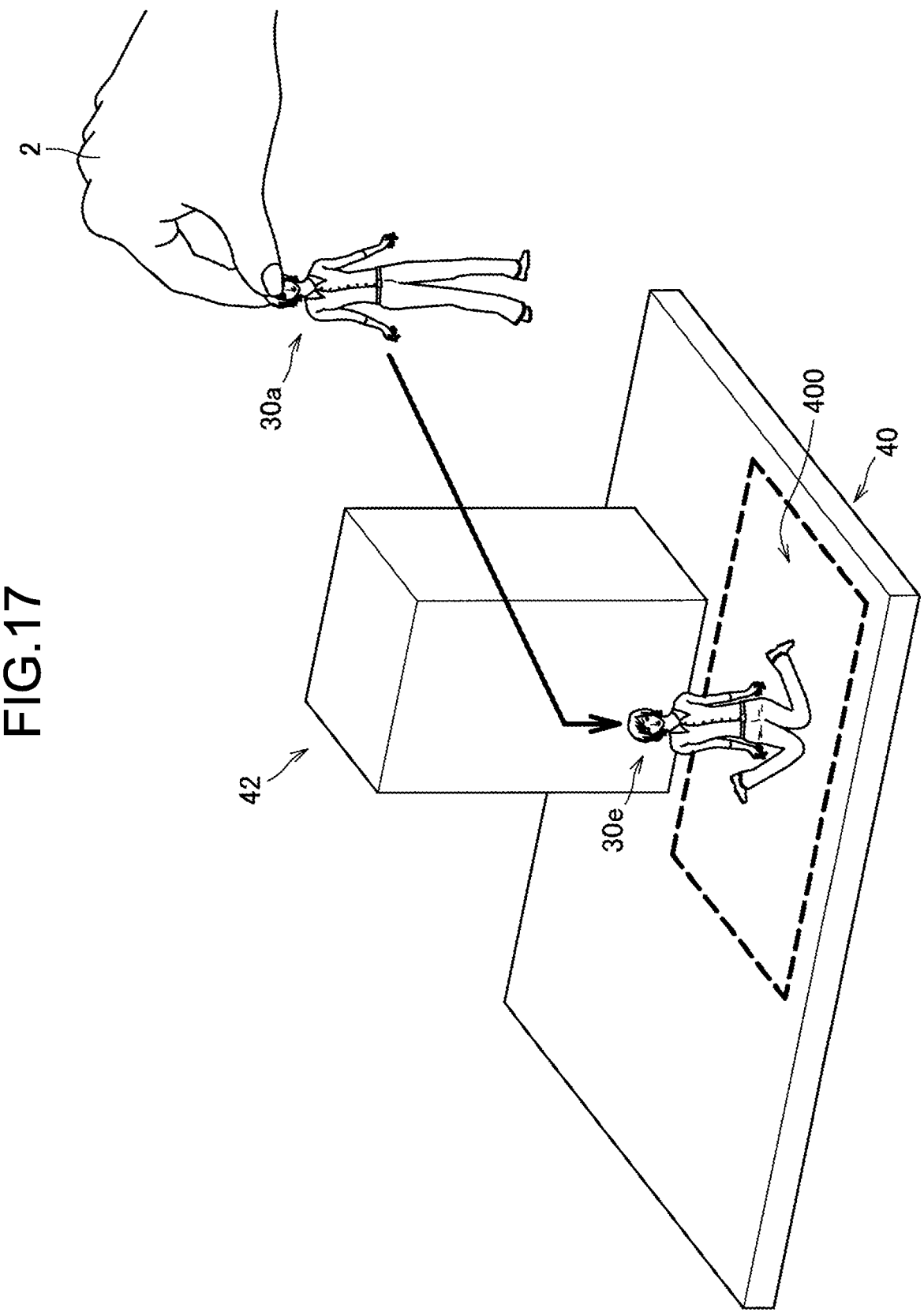
FIG. 17 is a view illustrating an example of changing a posture of a virtual object according to the second embodiment.

Moreover, as illustrated in FIG. 17, when the virtual object 30 is moved above the horizontal plane region 400, and in a case where a hand movement of pressing the virtual object 30 against the region 400 (to a position lower than the height of the virtual object) is recognized, the pose selection unit 108 determines the posture in which the virtual object 30 sits with the leg bent in the plane region 400 as the posture at the time of arrangement.

Modification

As a modification, in a case where the virtual object 30 is moved so that the virtual object 30 is arranged on the plane region 400 with the virtual object 30 laid down, the pose selection unit 108 may determine the sleeping posture on the region 400 as the posture at the time of arrangement.

Moreover, in a case where the virtual object 30 is moved so that the virtual object 30 is arranged on a step, the pose selection unit 108 may determine the posture in which the virtual object 30 stands with a leg on the step as the posture at the time of arrangement.

Although FIGS. 14 to 17 illustrate an example in which the virtual object has a human shape, the present invention is not limited to this example. The virtual object may have a shape of another creature (such as another animal or plant) or an artificial object (such as a robot or car).

{3-1-2. Display Control Unit 106}

The display control unit 106 according to the second embodiment changes the posture of the virtual object to the posture selected by the pose selection unit 108 when the virtual object is moved so as to be arranged on the real object as arrangement destination. For example, as illustrated in FIG. 14, it is assumed that the user moves the virtual object 30 so as to arrange the virtual object 30 on the plane region 400 of the real object 40 while holding the virtual object 30 with one hand 2. In this case, as illustrated in FIG. 14, the display control unit 106 changes the posture of the virtual object 30 so that the posture becomes a standing posture on the plane region 400 (selected by the pose selection unit 108).

Furthermore, every time the posture of the virtual object is changed, the display control unit 106 can cause the display unit 124 to display the changed virtual object.

<3-2. Process Flow>

The configuration of the second embodiment has been described above. Next, an example of a process flow according to the second embodiment will be described with reference to FIGS. 18 and 19. Here, it is assumed that the virtual object is displayed on the display unit 124.

Figure 18:
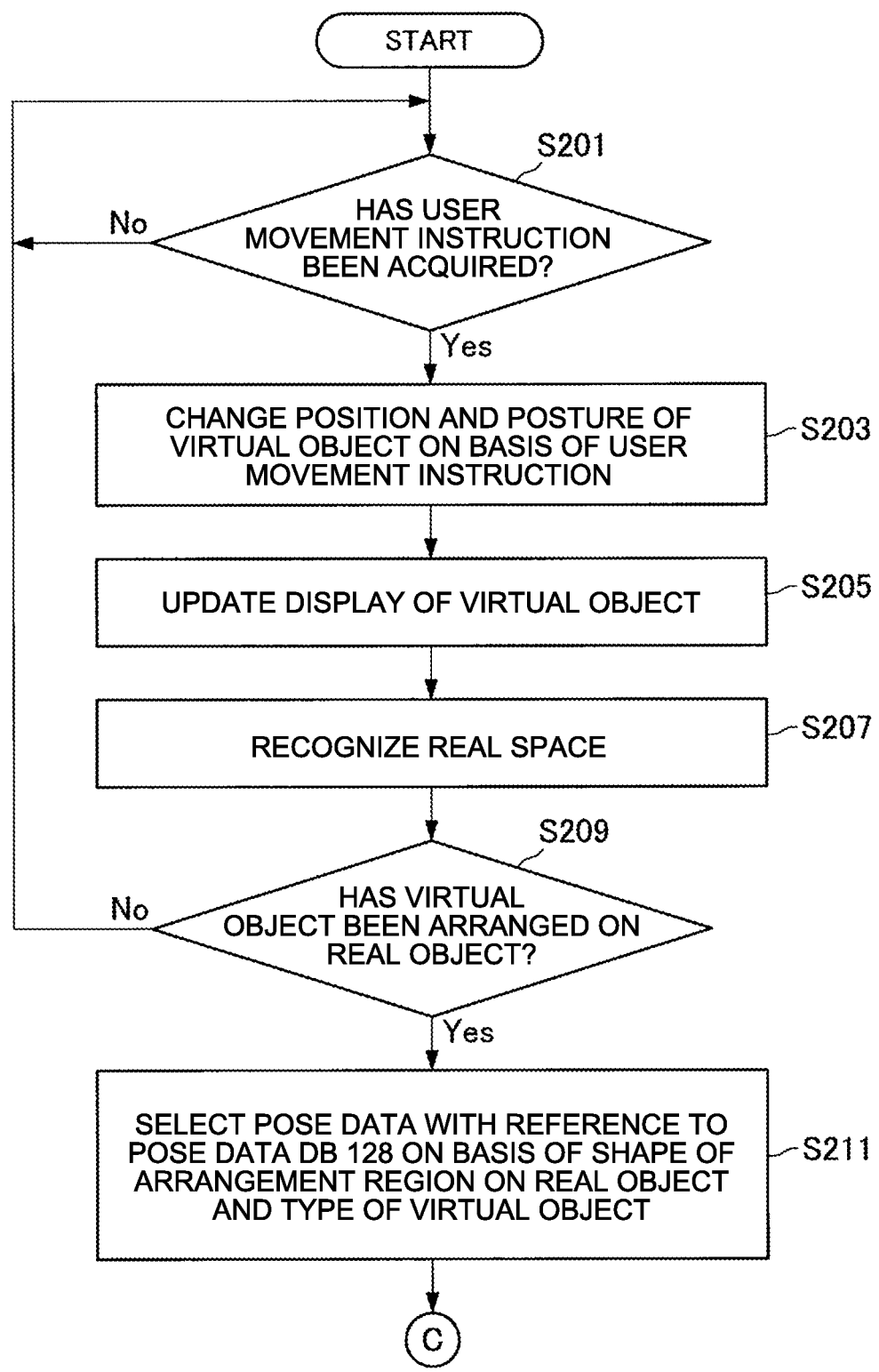
FIG. 18 is a flowchart illustrating a part of a process flow according to the second embodiment.

As illustrated in FIG. 18, the control unit 100 of the information processing apparatus 10-2 first determines whether a user's instruction to move the virtual object displayed on the display unit 124 has been acquired. For example, the control unit 100 determines whether a motion of moving the virtual object while holding the virtual object with one hand has been recognized on the basis of a result of image recognition on an image captured by the sensor unit 122, or the like. Alternatively, the control unit 100 determines whether instruction information for moving the virtual object based on operation of a predetermined device (such as a mouse) has been received (S201). In a case where the movement instruction has not been acquired (S201: No), the process of S201 is repeated.

In contrast, in a case where the movement instruction has been acquired (S201: Yes), the display control unit 106 changes the position and posture of the virtual object on the basis of the movement instruction (S203). Subsequently, the display control unit 106 causes the display unit 124 to display the virtual object after the change (S205).

Subsequently, the recognition unit 102 (newly) recognizes the real space on the basis of the sensing result of the sensor unit 122 (S207).

Thereafter, the display control unit 106 determines whether an instruction (movement) has been made to arrange the virtual object on any of the real objects in the real space (S209). In a case where there is no instruction to arrange the virtual object on any of the real objects (S209: No), the processes of S201 to S209 are repeated.

In contrast, in a case where the virtual object has been moved so as to be arranged on any of the real objects (S209: Yes), the pose selection unit 108 acquires, from the pose data DB 128, pose data associated with the shape of the arrangement region in the real object as arrangement destination and associated with the type of the virtual object. Subsequently, the pose selection unit 108 determines the acquired pose data as the posture of the virtual object at the arrangement in the arrangement region (S211).

Figure 19:
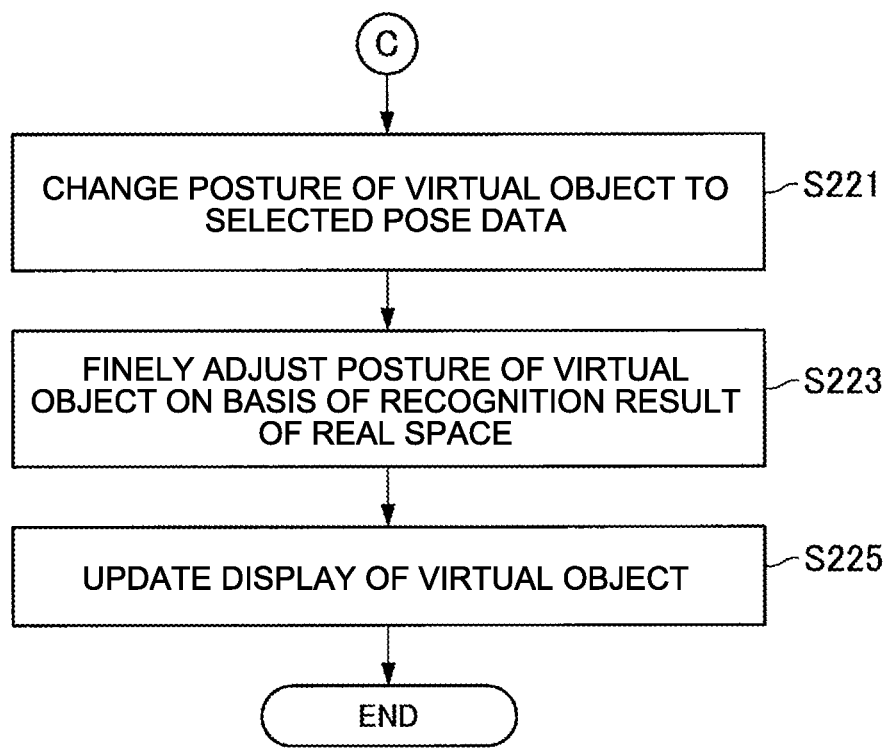
FIG. 19 is a flowchart illustrating a part of a process flow according to the second embodiment.

Here, the process flow following S211 will be described with reference to FIG. 19. As illustrated in FIG. 19, following the process of S211, the display control unit 106 changes the posture of the virtual object so as to be the posture determined in S211 (S221).

Subsequently, the display control unit 106 finely adjusts the posture of the virtual object after the change on the basis of the recognition result of the real space obtained in S207. For example, the display control unit 106 adjusts the posture of the virtual object after the change in accordance with the recognition result of the inclination of the arrangement region (S223).

Thereafter, the display control unit 106 causes the display unit 124 to display the virtual object after the change (S225).

<3-3. Effects>

As described above, when the virtual object is moved on the basis of the motion of the user's hand until it is determined that the virtual object is in contact with a real object as arrangement destination, the information processing apparatus 10-2 according to the second embodiment changes the posture of the virtual object so that the posture becomes the posture according to the shape of the arrangement region in the real object as arrangement destination and the type of the virtual object. This makes it possible to appropriately change the posture of the virtual object in accordance with the real object as arrangement destination in a situation where the user arranges the virtual object on the real object.

For example, in a case where the virtual object has a human shape and the arrangement region includes a plane, the information processing apparatus 10-2 changes the posture so that the virtual object stands on the arrangement region. Furthermore, in a case where the arrangement region includes an edge, the information processing apparatus 10-2 changes the posture so that the virtual object sits on the edge. As described above, according to the second embodiment, the state of the virtual object can be changed in high-context manners in accordance with the real object as arrangement destination.

<3-4. Modification>

<3-4-1. Modification 1>

Note that the second embodiment is not limited to the example described above. As a modification, when a virtual object is arranged on the real object as arrangement destination, the display control unit 106 may further change the appearance and size of the virtual object in accordance with a real object in the arrangement destination in addition to changing the posture of the virtual object. Alternatively, the display control unit 106 may further display another virtual object, for example, on the real object as arrangement destination. Alternatively, the display control unit 106 may further cause the display unit 124 to display an animation in which the virtual object moves in accordance with the real object as arrangement destination.

For example, when a virtual object is arranged on a cylindrical real object, the display control unit 106 may additionally display a virtual object of a live stage on the display unit 124, change the clothing of the virtual object into a live costume, change the size of the virtual object to a size suitable for the size of the top surface of the real object, and display an animation of the virtual object (with clothes and size that have been changed) dancing on the real object.

<3-4-2. Modification 2>

As another modification, when the virtual object is arranged on the real object as arrangement destination, the display control unit 106 may cause the display unit 124 to display a plurality of candidates for the posture of the virtual object after the change, and may allow the user to select one of the plurality of candidates by pointing, gaze gesture, or the like, for example. In this case, the display control unit 106 can change the posture of the virtual object to a posture corresponding to the candidate selected by the user.

Alternatively, when a virtual object is arranged on the real object as arrangement destination, the display control unit 106 may change the posture of the virtual object to one of the plurality of posture candidates and display the virtual object on the display unit 124, and may thereafter allow the user to change the posture of the virtual object to a posture corresponding to another one of the plurality of candidates. For example, after a virtual object is arranged on the real object as arrangement destination, the display control unit 106 may sequentially change the posture of the virtual object to a posture corresponding to another one of the posture candidates out of the plurality of posture candidates every time it is detected that the user has issued a predetermined voice command (for example, "Next").

<3-4-3. Modification 3>

As another modification, when or after a virtual object is arranged on the real object as arrangement destination, the display control unit 106 may further change the posture of the virtual object on the basis of a recognition result of the state of the user. For example, immediately after the virtual object is arranged on the real object as arrangement destination, the recognition unit 102 can recognize the orientation of the user's face on the basis of a sensing result obtained by the sensor unit 122 or a predetermined sensor in the environment. In this case, the display control unit 106 may change the posture of the virtual object so that the whole body of the virtual object faces the recognized direction of the user. Alternatively, in a case where the virtual object is a human-shaped object, the display control unit 106 may change the posture of the virtual object so that the face of the virtual object is selectively directed to the user (without changing the posture of the body of the virtual object).

Alternatively, the information processing apparatus 10-2 may recognize the user's mental state (smiling or being angry, for example) using a known technique, and may change the posture of the virtual object in accordance with the recognized mental state.

4. Hardware Configuration

Figure 20:
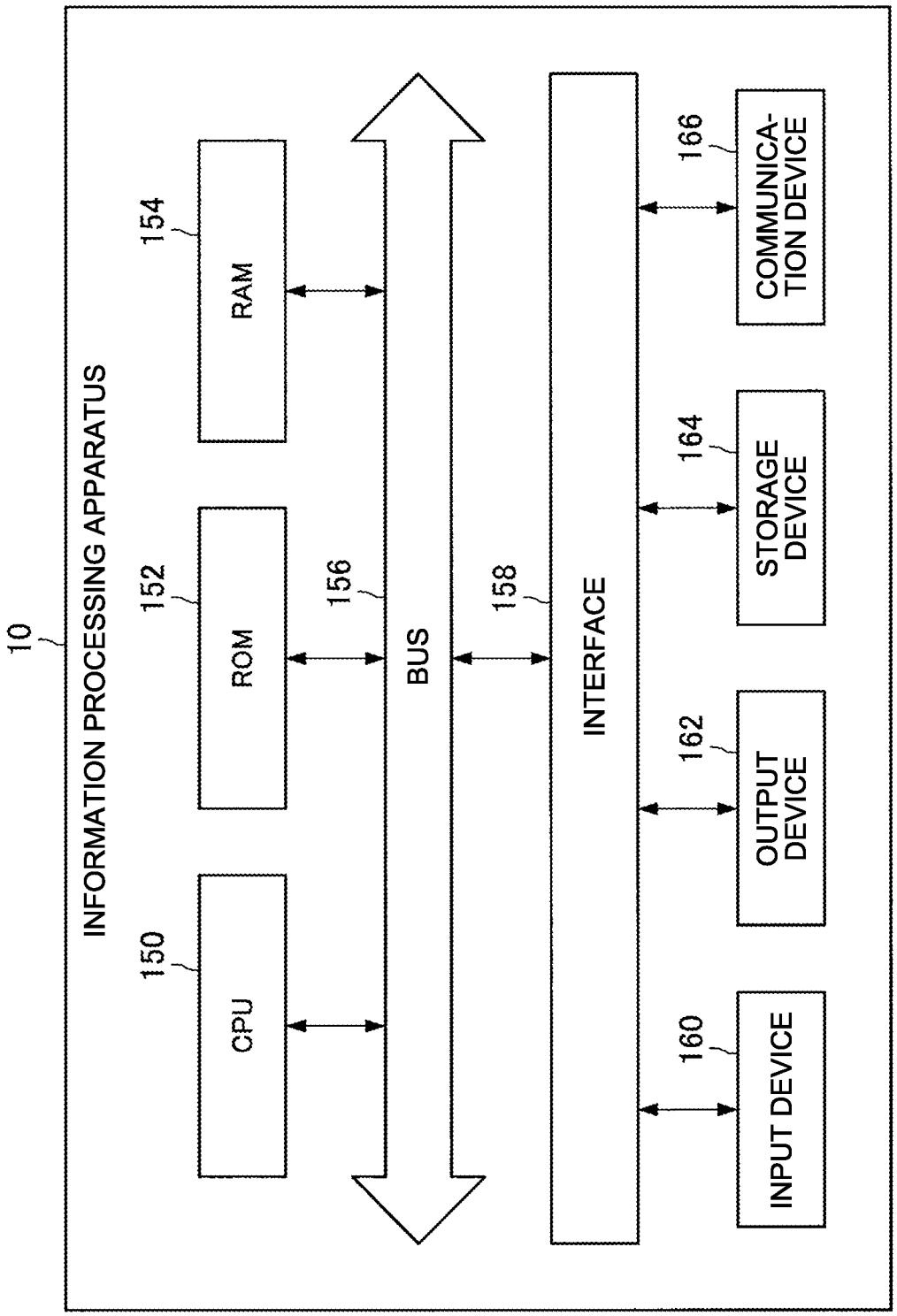
FIG. 20 is a diagram illustrating a hardware configuration example of the information processing apparatus 10 common to each of embodiments.

Next, a hardware configuration of the information processing apparatus 10 according to each of embodiments will be described with reference to FIG. 20. As illustrated in FIG. 20, the information processing apparatus 10 includes a CPU 150, a read only memory (ROM) 152, a random access memory (RAM) 154, a bus 156, an interface 158, an input device 160, an output device 162, a storage device 164, and a communication device 166.

The CPU 150 functions as an arithmetic processing device and a control device, and controls overall operation in the information processing apparatus 10 in accordance with various programs. The CPU 150 implements the function of the control unit 100 in the information processing apparatus 10. The CPU 150 includes a processor such as a microprocessor.

The ROM 152 stores programs used by the CPU 150, control data such as operation parameters, or the like.

The RAM 154 temporarily stores a program executed by the CPU 150, data in use, for example.

The bus 156 includes a CPU bus or the like. The bus 156 connects the CPU 150, the ROM 152, and the RAM 154 to each other.

The interface 158 connects the input device 160, the output device 162, the storage device 164, and the communication device 166 to the bus 156.

The input device 160 includes an input unit for inputting information by a user such as, for example, a touch panel, a button, a switch, a lever, or a microphone, and an input control circuit that generates an input signal on the basis of an input by the user and outputs the input signal to the CPU 150.

The output device 162 includes a display such as an LCD or an OLED, or a display device such as a projector. Further, the output device 162 may include a sound output device such as a speaker.

The storage device 164 is a device for storing data that functions as the storage unit 126. The storage device 164 includes, for example, a storage medium, a recording device that records data on the storage medium, a reading device that reads data from the storage medium, a deletion device that deletes data recorded on the storage medium, or the like.

The communication device 166 is a communication interface including, for example, a communication device (for example, a network card) for connecting to the communication network 22 or the like. The communication device 166 may be a wireless LAN compatible communication device, a Long Term Evolution (LTE) compatible communication device, or a wired communication device that performs wired communication. The communication device 166 functions as the communication unit 120.

5. Modifications

The preferred embodiments of the present disclosure have been described in detail above with reference to the accompanying drawings. However, the present disclosure is not limited to such examples. It is obvious that a person having ordinary knowledge in the technological field of the present disclosure can conceive alterations or modifications within the scope of the technical concept described here in the claims, and these, of course, should understandably belong to the technical scope of the present disclosure.

<5.1 Modification 1>

Each of the embodiments described above is an example in which the information processing apparatus 10 includes the display unit 124. However, the present invention is not limited to such an example. For example, the information processing apparatus 10 and the display unit 124 may be provided as separate devices, and the information processing apparatus 10 and the display unit 124 may be able to communicate with each other by wireless communication, for example. In this case, the information processing apparatus 10 may be, for example, a general personal computer (PC), a tablet terminal, a game machine, a mobile phone such as a smartphone, a portable music player, a speaker, an in-vehicle device (such as a car navigation device), or a robot (a humanoid robot, for example). Alternatively, the information processing apparatus 10 may be integrated with the server 20.

Although FIG. 1 includes illustration of the information processing apparatus 10 alone, the present invention is not limited to such an example. The function of the information processing apparatus 10 according to each of embodiments may be implemented by a plurality of computers working in cooperation.

<5.2. Modification 2>

Individual steps in the process flow of each of embodiments described above do not have to be performed in the order described. For example, individual steps may be processed in an appropriately changed order. Moreover, individual steps may be partially processed in parallel or separately instead of being processed in time series. Some of the described steps may be omitted, or another step may be further added.

According to each of the embodiments described above, it is also possible to provide a computer program for causing hardware such as the CPU 150, the ROM 152, and the RAM 154 to implement functions equivalent to those of the components of the information processing apparatus 10 according to each of embodiments. A storage medium in which the computer program is recorded is also provided.

Furthermore, the effects described in the present specification are merely illustrative or exemplary and are not limited. That is, the technology according to the present disclosure can exhibit other effects that are apparent to those skilled in the art from the description of the present specification in addition to or instead of the above effects.

The following configurations also belong to the technological scope of the present disclosure.

(1)

An information processing apparatus comprising:

an information acquisition unit that acquires position information of a virtual object displayed by a display unit in a real space, position information of a first real object associated with a user, and position information of a second real object in the real space; and a display control unit that changes a posture of the virtual object on the basis of a posture change rule corresponding to a relationship between the position information of the virtual object, the position information of the first real object, and the position information of the second real object.

(2)

The information processing apparatus according to (1), wherein the first real object is a first hand of the user, the second real object is a second hand of the user, and the display control unit changes the posture of the virtual object in accordance with a change in the position of the first hand or the second hand after the first hand and the second hand are determined to come in contact with the virtual object.

(3)

The information processing apparatus according to (2), wherein the virtual object includes a plurality of fixed parts, and a movable part provided for each of two adjacent fixed parts to rotatably connect the two adjacent fixed parts, the display control unit determines one or more movable parts of the virtual object as posture change targets on the basis of a relationship between a first contact position of the first hand in the virtual object when it is determined that the first hand comes in contact with the virtual object and a second contact position of the second hand in the virtual object when it is determined that the second hand comes in contact with the virtual object, and changes postures of the one or more movable parts as posture change targets in accordance with a change in the position of the first hand or the second hand after determination of the one or more movable parts as posture change targets, and thereby changes the posture of the virtual object.

(4)

The information processing apparatus according to (3), wherein the display control unit determines the one or more movable parts as posture change targets on the basis of a positional relationship between a first fixed unit corresponding to the first contact position and a second fixed unit corresponding to the second contact position, and the one or more movable parts as posture change targets are continuously connected with the plurality of fixed parts connected to each of the one or more movable parts as posture change targets.

(5)

The information processing apparatus according to (4), wherein the display control unit further determines the one or more movable parts as posture change targets on the basis of whether a predetermined fixed part is present in one or more fixed parts on a path connecting the first fixed part with the second fixed part.

(6)

The information processing apparatus according to (5), wherein in a case where the predetermined fixed part is present in the one or more fixed parts on the path connecting the first fixed part with the second fixed part, the display control unit determines one or more movable parts located within a range from the fixed part farther from the predetermined fixed part out of the first fixed part and the second fixed part to the predetermined fixed part, as the one or more movable parts as posture change targets, and in a case where the predetermined fixed part is not present in the one or more fixed parts on the path connecting the first fixed part with the second fixed part, the display control unit determines one or more movable parts located within a range from the first fixed part to the second fixed part, as the one or more movable parts as posture change targets.

(7)

The information processing apparatus according to any one of (4) to (6), wherein the display control unit fixes a posture of a third fixed part connected to a movable part at a first end of the one or more movable parts as posture change targets, and changes a rotation angle of each of the one or more movable parts as posture change targets in accordance with a change in the position of the first hand or the second hand after the determination of the one or more movable parts as posture change targets, and thereby changes the posture of the virtual object.

(8)

The information processing apparatus according to (7), wherein the display control unit changes a position and posture of a fourth fixed part connected to a movable part at a second end opposite to the first end of the one or more movable parts as posture change targets in accordance with a change in the position of the first hand or the second hand after the determination of the one or more movable parts as posture change targets, and thereby changes the posture of the virtual object.

(9)

The information processing apparatus according to (8), wherein one of the third fixed part and the fourth fixed part is the same as one of the first fixed part and the second fixed part.

(10)

The information processing apparatus according to (9), wherein the first fixed part is one fixed part determined to be first held by the first hand out of the plurality of fixed parts included in the virtual object, and the second fixed part is one fixed part determined to be first held by the second hand out of the plurality of fixed parts included in the virtual object.

(11)

The information processing apparatus according to (2), wherein the first real object is the first hand of the user instructing a change of the position information of the virtual object, the second real object is either the second hand of the user not instructing the change of the position information of the virtual object, or a real object different from the user, and when the virtual object is moved to come in contact with the second real object, the display control unit changes the posture of the virtual object in accordance with a shape of a region including a third contact position determined to come in contact with the virtual object, within the second real object.

(12)

The information processing apparatus according to (11), wherein the display control unit further changes the posture of the virtual object in accordance with a type of the virtual object.

(13)

The information processing apparatus according to (12), wherein the virtual object is moved in accordance with the change in the position of the first hand, and the instruction to change the position information of the virtual object includes moving the virtual object until the virtual object that has been determined to be in non-contact with the second real object is determined to have come in contact with the second real object.

(14)

The information processing apparatus according to (13), wherein the display control unit changes the posture of the virtual object further in accordance with a height of the position of the first hand from the third contact position when the virtual object has been moved until the virtual object is determined to have come in contact with the second real object.

(15)

The information processing apparatus according to (14), wherein in a case where the shape of the region including the third contact position is a plane, the display control unit changes the posture of the virtual object so that the posture of the virtual object becomes a posture standing on the region or sitting on the region in accordance with the type of the virtual object and the height of the first hand from the third contact position.

(16)

The information processing apparatus according to any one of (13) to (15), wherein in a case where the shape of the region including the third contact position includes an edge, the display control unit changes the posture of the virtual object so that the posture of the virtual object becomes a posture sitting on the region.

(17)

The information processing apparatus according to (9) or (10), wherein the display control unit causes the display unit to display a changed virtual object every time the posture of the virtual object is changed.

(18)

The information processing apparatus according to (17), further comprising:

a recognition unit that recognizes the first hand and the second hand on the basis of a sensing result of the real space; and the display unit, wherein the information processing apparatus is a head-mounted device.

(19)

An information processing method comprising:

acquiring position information of a virtual object displayed by a display unit in a real space, position information of a first real object associated with a user, and position information of a second real object in the real space; and changing, by a processor, a posture of the virtual object on the basis of a posture change rule corresponding to a relationship between the position information of the virtual object, the position information of the first real object, and the position information of the second real object.

(20) A program causing a computer to function as:

an information acquisition unit that acquires position information of a virtual object displayed by a display unit in a real space, position information of a first real object associated with a user, and position information of a second real object in the real space; and a display control unit that changes a posture of the virtual object on the basis of a posture change rule corresponding to a relationship between the position information of the virtual object, the position information of the first real object, and the position information of the second real object.

REFERENCE SIGNS LIST 10-1, 10-2 INFORMATION PROCESSING APPARATUS
20 SERVER
22 COMMUNICATION NETWORK
30 VIRTUAL OBJECT
100 CONTROL UNIT
102 RECOGNITION UNIT
104 INFORMATION ACQUISITION UNIT
106 DISPLAY CONTROL UNIT
108 POSE SELECTION UNIT
120 COMMUNICATION UNIT
122 SENSOR UNIT
124 DISPLAY UNIT
126 STORAGE UNIT
128 POSE DATA DB

The invention claimed is:

1. An information processing apparatus comprising:
an information acquisition unit configured to acquire position information of a virtual object displayed by a display unit in a real space, position information of a first real object associated with a user, and position information of a second real object in the real space; and
a display control unit configured to change a posture of the virtual object based on a posture change rule corresponding to a relationship between the position information of the virtual object, the position information of the first real object, and the position information of the second real object,
wherein the first real object is a first hand of the user,
wherein the second real object is a second hand of the user,
wherein the display control unit is further configured to
determine one or more movable parts of the virtual object as posture change targets based on a relationship between the position information of the virtual object, an initial position of the first hand, and an initial position of the second hand, and
change postures of the one or more movable parts of the virtual object as posture change targets based on the posture change rule, and
wherein the information acquisition unit and the display control unit are each implemented via at least one processor.

2. The information processing apparatus according to claim 1,
wherein the display control unit changes the posture of the virtual object in accordance with a change in the position of the first hand or the second hand after the first hand and the second hand are determined to come in contact with the virtual object.

3. The information processing apparatus according to claim 2,
wherein the virtual object includes a plurality of fixed parts, and a movable part provided for each of two adjacent fixed parts to rotatably connect the two adjacent fixed parts,
the display control unit determines the one or more movable parts of the virtual object as posture change targets based on a relationship between a first contact position of the first hand in the virtual object when it is determined that the first hand comes in contact with the virtual object and a second contact position of the second hand in the virtual object when it is determined that the second hand comes in contact with the virtual object, and changes postures of the one or more movable parts as posture change targets in accordance with a change in the position of the first hand or the second hand after determination of the one or more movable parts as posture change targets, and thereby changes the posture of the virtual object.

4. The information processing apparatus according to claim 3,
wherein the display control unit determines the one or more movable parts as posture change targets based on a positional relationship between a first fixed unit corresponding to the first contact position and a second fixed unit corresponding to the second contact position, and
the one or more movable parts as posture change targets are continuously connected with the plurality of fixed parts connected to each of the one or more movable parts as posture change targets.

5. The information processing apparatus according to claim 4,
wherein the display control unit further determines the one or more movable parts as posture change targets based on whether a predetermined fixed part is present in one or more fixed parts on a path connecting the first fixed part with the second fixed part.

6. The information processing apparatus according to claim 5,
wherein in a case where the predetermined fixed part is present in the one or more fixed parts on the path connecting the first fixed part with the second fixed part, the display control unit determines one or more movable parts located within a range from the fixed part farther from the predetermined fixed part out of the first fixed part and the second fixed part to the predetermined fixed part, as the one or more movable parts as posture change targets, and
in a case where the predetermined fixed part is not present in the one or more fixed parts on the path connecting the first fixed part with the second fixed part, the display control unit determines one or more movable parts located within a range from the first fixed part to the second fixed part, as the one or more movable parts as posture change targets.

7. The information processing apparatus according to claim 4,
wherein the display control unit fixes a posture of a third fixed part connected to a movable part at a first end of the one or more movable parts as posture change targets, and
changes a rotation angle of each of the one or more movable parts as posture change targets in accordance with a change in the position of the first hand or the second hand after the determination of the one or more movable parts as posture change targets, and thereby changes the posture of the virtual object.

8. The information processing apparatus according to claim 7,
wherein the display control unit changes a position and posture of a fourth fixed part connected to a movable part at a second end opposite to the first end of the one or more movable parts as posture change targets in accordance with a change in the position of the first hand or the second hand after the determination of the one or more movable parts as posture change targets, and thereby changes the posture of the virtual object.

9. The information processing apparatus according to claim 8,
wherein one of the third fixed part and the fourth fixed part is the same as one of the first fixed part and the second fixed part.

10. The information processing apparatus according to claim 9,
wherein the first fixed part is one fixed part determined to be first held by the first hand out of the plurality of fixed parts included in the virtual object, and
the second fixed part is one fixed part determined to be first held by the second hand out of the plurality of fixed parts included in the virtual object.

11. The information processing apparatus according to claim 9,
wherein the display control unit causes the display unit to display a changed virtual object every time the posture of the virtual object is changed.

12. The information processing apparatus according to claim 11, further comprising:
a recognition unit configured to recognize the first hand and the second hand based on a sensing result of the real space; and
the display unit,
wherein the information processing apparatus is a head-mounted device, and
wherein the recognition unit is implemented via at least one processor.

13. The information processing apparatus according to claim 2,
wherein the first real object is the first hand of the user instructing a change of the position information of the virtual object,
the second real object is either the second hand of the user not instructing the change of the position information of the virtual object, or a real object different from the user, and
when the virtual object is moved to come in contact with the second real object, the display control unit changes the posture of the virtual object in accordance with a shape of a region including a third contact position determined to come in contact with the virtual object, within the second real object.

14. The information processing apparatus according to claim 13,
wherein the display control unit further changes the posture of the virtual object in accordance with a type of the virtual object.

15. The information processing apparatus according to claim 14,
wherein the virtual object is moved in accordance with the change in the position of the first hand, and the instruction to change the position information of the virtual object includes moving the virtual object until the virtual object that has been determined to be in non-contact with the second real object is determined to have come in contact with the second real object.

16. The information processing apparatus according to claim 15,
wherein the display control unit changes the posture of the virtual object further in accordance with a height of the position of the first hand from the third contact position when the virtual object has been moved until the virtual object is determined to have come in contact with the second real object.

17. The information processing apparatus according to claim 16,
wherein in a case where the shape of the region including the third contact position is a plane, the display control unit changes the posture of the virtual object so that the posture of the virtual object becomes a posture standing on the region or sitting on the region in accordance with the type of the virtual object and the height of the first hand from the third contact position.

18. The information processing apparatus according to claim 15,
wherein in a case where the shape of the region including the third contact position includes an edge, the display control unit changes the posture of the virtual object so that the posture of the virtual object becomes a posture sitting on the region.

19. An information processing method comprising:
acquiring position information of a virtual object displayed by a display unit in a real space, position information of a first real object associated with a user, and position information of a second real object in the real space; and
changing, by a processor, a posture of the virtual object based on a posture change rule corresponding to a relationship between the position information of the virtual object, the position information of the first real object, and the position information of the second real object,
wherein the first real object is a first hand of the user,
wherein the second real object is a second hand of the user, and
wherein changing the posture of the virtual object includes
determining one or more movable parts of the virtual object as posture change targets based on a relationship between the position information of the virtual object, an initial position of the first hand, and an initial position of the second hand, and
changing postures of the one or more movable parts of the virtual object as posture change targets based on the posture change rule.

20. A non-transitory computer-readable storage medium having embodied thereon a program, which when executed by a computer causes the computer to execute a method, the method comprising:
acquiring position information of a virtual object displayed by a display unit in a real space, position information of a first real object associated with a user, and position information of a second real object in the real space; and
changing a posture of the virtual object based on a posture change rule corresponding to a relationship between the position information of the virtual object, the position information of the first real object, and the position information of the second real object, wherein the first real object is a first hand of the user, wherein the second real object is a second hand of the user, and wherein changing the posture of the virtual object includes
- determining one or more movable parts of the virtual object as posture change targets based on a relationship between the position information of the virtual object, an initial position of the first hand, and an initial position of the second hand, and
- changing postures of the one or more movable parts of the virtual object as posture change targets based on the posture change rule.

* * * * *